(12) United States Patent
Yoshinari

(10) Patent No.: US 10,766,199 B2
(45) Date of Patent: Sep. 8, 2020

(54) THREE-DIMENSIONAL ADDITIVE MANUFACTURING DEVICE

(71) Applicant: JEOL Ltd., Tokyo (JP)

(72) Inventor: Yohsuke Yoshinari, Tokyo (JP)

(73) Assignee: JEOL Ltd., Tokyo (JP)

( * ) Notice: Subject to any disclaimer, the term of this patent is extended or adjusted under 35 U.S.C. 154(b) by 148 days.

(21) Appl. No.: 16/018,483

(22) Filed: Jun. 26, 2018

(65) Prior Publication Data

US 2019/0054701 A1 Feb. 21, 2019

(30) Foreign Application Priority Data

Jun. 28, 2017 (JP) ................. 2017-125911

(51) Int. Cl.
| | | |
|---|---|---|
| *B29C 64/393* | (2017.01) | |
| *B33Y 50/02* | (2015.01) | |
| *B22F 3/105* | (2006.01) | |
| *B33Y 30/00* | (2015.01) | |
| *B29C 64/321* | (2017.01) | |
| *B29C 64/268* | (2017.01) | |

(52) U.S. Cl.
CPC .......... *B29C 64/393* (2017.08); *B22F 3/1055* (2013.01); *B29C 64/268* (2017.08); *B29C 64/321* (2017.08); *B33Y 30/00* (2014.12); *B33Y 50/02* (2014.12); *B22F 2003/1057* (2013.01)

(58) Field of Classification Search
None
See application file for complete search history.

(56) References Cited

U.S. PATENT DOCUMENTS

| | | |
|---|---|---|
| 2004/0104499 A1 | 6/2004 | Keller |
| 2007/0196561 A1 | 8/2007 | Philippi et al. |
| 2018/0229304 A1 | 8/2018 | Lettner |

FOREIGN PATENT DOCUMENTS

| | | |
|---|---|---|
| EP | 3363562 A1 | 8/2018 |
| JP | 2001152204 A | 6/2001 |

OTHER PUBLICATIONS

Sames, Additive Manufacturing of Inconel 718 using Electron Beam Melting: Processing, Post-processing, & Mechanical Properties, Submitted to the Office of Graduate and Professional Studies of Texas A&M University, May 2015, pp. 130-141.
Extended European Search Report dated Nov. 23, 2018 in EP18179677.2.

*Primary Examiner* — Peter L Vajda
*Assistant Examiner* — Adrianna N Konves
(74) *Attorney, Agent, or Firm* — The Webb Law Firm

(57) ABSTRACT

An aspect of the present invention includes: a base plate that moves along a vertical direction; a powder feeding unit that laminates a powder layer on an upper surface of the base plate; a beam generating unit that generates a beam in a designated quantity of heat; and a control unit that causes the beam generating unit to irradiate a designated position of the powder layer with the beam in a scan order programmed based on three-dimensional model data. The control unit calculates a required quantity of heat to be input to the designated position, based on heat capacity of the designated position of the powder layer, to set a temperature of the designated position at a desired temperature at a future designated time, and the control unit controls the beam generated by the beam generating unit to enable input of the required quantity of heat to the designated position.

4 Claims, 18 Drawing Sheets

To keep just-before-squeezing temp. at 870 C (28.mA)

THREE-DIMENSIONAL ADDITIVE MANUFACTURING DEVICE

CROSS-REFERENCE TO RELATED APPLICATION

This application claims priority to Japanese Patent Application No. 2017-125911 filed Jun. 28, 2017, the disclosure of which is hereby incorporated in its entirety by reference.

BACKGROUND

Technical Field

The present invention relates to a three-dimensional additive manufacturing device that laminates layers of thinly spread powder samples layer by layer.

Related Art

In the related art, three-dimensional additive manufacturing technology has been put for practical use. In this technology, a three-dimensional object is modeled by laminating cross-sectional shapes of the object based on design data created by three-dimensional computer-aided design (CAD) or the like. Examples of a modeling method in the technology include stereolithography, fused deposition modeling, and powder sintering additive manufacturing (also referred to as "powder bed additive manufacturing").

Among these three-dimensional additive manufacturing techniques, the powder sintering additive manufacturing has received attention in recent years. In this technique, layers of thinly spread powder samples (hereinafter referred to as "powder layer(s)") are laminated layer by layer to manufacture a model. In a three-dimensional additive manufacturing device that manufactures a model by the powder sintering additive manufacturing, powder samples (corresponding to a metallic powder 9 in FIG. 5 to be described) are spread thinly over a flat base plate (corresponding to a base plate 5 in FIG. 5). With a laser beam or an electron beam (an example of charged particle beam) serving as a heat source and having a reduced beam diameter, the three-dimensional additive manufacturing device locally irradiates (a to-be-modeled part of) a powder layer including the thinly spread powder samples so as to melt and solidify (fix) the powder samples. An area fixed herein corresponds to a cross section when a three-dimensional structure (model) portrayed by three-dimensional CAD data is sliced in a plane perpendicular to a certain fixed axis orientation (laminating direction). While lowering the base plate in a height direction of the model, the three-dimensional additive manufacturing device spreads the powder samples over the base plate and repeatedly performs melting and fixing of a predetermined area of the powder layer, whereby modeling a three-dimensional structure of laminated thin sectional objects.

For example, JP 2001-152204 A discloses a method for manufacturing a three-dimensional structure by the powder sintering additive manufacturing. In this method, a powder material containing 50% by weight or more of an iron-base powder and a non-ferrous-base powder is irradiated with a light beam to form a hardened layer, and this hardened layer is piled on top of another to manufacture a model having a desired three-dimensional shape.

With reference to FIGS. 1 to 3, the three-dimensional additive manufacturing technology based on the powder sintering additive manufacturing will be described in more detail. FIG. 1 is an explanatory view showing (first) steps of the three-dimensional additive manufacturing based on the powder sintering additive manufacturing. FIG. 2 is an explanatory view showing (second) steps of the three-dimensional additive manufacturing based on the powder sintering additive manufacturing. FIG. 3 is an explanatory view showing a relationship between an electron beam irradiation time and a temperature of (a designated area of) a modeled surface. Hereinafter described is an example in which an electron beam is used as a heat source.

In the three-dimensional additive manufacturing using an electron beam EB, an electron beam generating device 2 accelerates electrons having a negative charge (charged particles) at high voltage and irradiates a metallic powder $9n$ spread over the base plate 5 with the electron beam EB. When the electrons are trapped and stopped on a surface layer of the spread metallic powder $9n$, the kinetic energy which the electrons have been holding until then is converted into a quantity of heat for melting the metallic powder $9n$.

However, it is known that excessive input of charged particles charges the metallic powder $9n$ and causes powder scattering attributed to Coulomb repulsive force. In order to prevent this phenomenon, a modeled surface is preliminarily heated with the electron beam EB ("secondary preheating", a view in the upper side of FIG. 1), and a metallic powder $9_{n+1}$ is newly spread over the surface heated to a high temperature and goes through a process called "presintering" (a view in the middle of FIG. 1). This operation intensifies an electrical contact effect between the metallic powders $9n$ and offers a path which is led to the base plate 5 and which allows extra charges to escape therefrom. In FIGS. 1 and 2, the darker portions indicate that they are higher in temperature.

After this presintering, the whole area of the modeled surface (powder layer including the metallic powder $9_{n+1}$) is scanned at high speed with the electron beam EB in order to temporarily return the temperature of the modeled surface to a desired temperature ("primary preheating"), and then, the temperature of the modeled surface is raised (a view in the lower side of FIG. 1). A process corresponding to the modeling (primary melting, primary sintering) (a view in the upper side of FIG. 2) is carried out so as to melt (primarily melt) a designated area and then solidify (primarily sinter) the same ("modeling"). Due to solidification of the melted portion in the powder layer irradiated with the electron beam for manufacturing a model, a fixed area Af is formed. After formation of the fixed area Af, the whole area of the modeled surface (the uppermost powder layer) is scanned again with the electron beam EB at high speed ("secondary preheating") to prepare for the subsequent process, "metallic powder spreading" (a view in the lower side of FIG. 2).

SUMMARY

In preheating and presintering, the whole area of a modeled surface is scanned with an electron beam EB at high speed. Undergoing these processes not only prevents scattering of a metallic powder but also contributes to achievement of manufacturing a model under high temperature (hot process) to reduce heat stress and heat strain of the metallic model. However, as for a certain metallic powder, a temperature of a modeled surface after spreading the metallic powder and right before presintering is kept at a high temperature of 700° C. or more, otherwise the metallic powder scatters. In addition, local temperature reduction of the modeled surface induces crystal distortion and failure of melting in the model, which may affect the quality after modeling. Therefore, in order to continue additive manufacturing and to manufacture a model with good quality, it is extremely important to control temperatures of a modeled surface and lower layers as well as the top layer that includes a newly spread metallic powder.

In order to prevent scattering of the metallic powder newly spread over the modeled surface, a temperature of the modeled surface right before metallic powder spreading (T0 shown in FIG. 3) should be equal to or higher than a certain target temperature (unshown T1). However, due to oxidation in the surface of the metallic powder or influences of an increase in surface area attributed to the spherical shape of the metallic powder, heat radiation from the modeled surface including the spread metallic powder is larger than a metallic plate including a material similar to the modeled surface. Therefore, as soon as the electron beam is turned off, the modeled surface heated by high-speed scan with the electron beam is cooled rapidly, and the temperature of the modeled surface gradually approaches the temperature of a thermal reservoir defined by an area including a certain region and disposed right under the modeled surface.

FIG. 3 is an explanatory view showing an example of temporal fluctuations of surface temperature during modeling measured by a radiation thermometer. This temperature fluctuates depending on materials, particle sizes, and pulverized states (solid states) of the powder and is highly likely to fluctuate on a moment-to-moment basis during the modeling. Therefore, it is necessary to control the temperature of the modeled surface in real time.

The temperature of the modeled surface during presintering temporarily rise due to heat propagation from the lower layer, but the modeled surface is gradually cooled by heat radiation and heat transfer to a powder layer in the lower layer. In a case where a plurality of models are manufactured on the same surface, a cumulative operating time according to individual modeling further decreases a local surface temperature of an area where the next model is to be manufactured. Modeling under such circumstances causes insufficient amount of heat input required for melting (hereinafter also referred to as a "required quantity of heat") and causes a decrease in melting volume, which results in a model with crystal distortion and failure of melting or with many defects inside the model (in a depth direction). Therefore, it is required to control the temperature of the modeled surface locally in real time.

Furthermore, on completion of the modeling, the secondary preheating is performed by scanning a surface layer of the metallic powder (modeled surface) with the electron beam at high speed. After the temperature of the modeled surface reaches a predetermined temperature (T2), the electron beam is turned off to prepare for the next step: spreading a new metallic powder. Accordingly, the temperature of the modeled surface decreases precipitously. However, it is not certain whether the temperature right before the metallic powder spreading (T0) is at the desired temperature (T1). The reason is that heat capacity differs depending on the presence or absence of past and present models, and a temperature increase due to a quantity of heat input differs between the past and the present. Therefore, an inequality (temperature T0)>(temperature T1) is not always guaranteed just because the temperature of the modeled surface reaches the predetermined temperature (T2). In FIG. 3, "T3" indicates a maximum temperature during the presintering, and "T4" indicates a temperature right before primary preheating.

If the inequality is not true, the secondary preheating may be performed again. However, heating the modeled surface having a temperature decreased causes time consumption and a prolonged modeling time. There is a way to complete the secondary preheating within a certain time, however, similarly to the above case, the temperature right before the metallic powder spreading (T0) is not guaranteed at the desired temperature (T1). In other words, even though the temperature of the modeled surface during preheating is measured, the surface temperature at the time of the metallic powder spreading is not always guaranteed, and what is more, it is not guaranteed that the modeled surface has a quantity of heat sufficient to heat a newly spread metallic powder.

Changing current values of an electron beam and adjusting a quantity of heat input is a typical function in a three-dimensional additive manufacturing device. Therefore, in order to guarantee the quantity of heat input, a large current value may be used to reduce an operating time of the secondary preheating. However, depending on the length of the operating time of the secondary preheating, a temperature decrease of the surface layer also differs. This is due to the fact that heat input and heat loss are independent phenomena. Therefore, a short operating time reduces the temperature decrease. Accordingly, it is required to adjust a preheating time with consideration of the temperature decrease that depends on an increase and a decrease of an electron beam irradiation time. In other words, it is required to solve a self-consistent problem.

In other words, it is necessary to reflect the presence of past and present models and to calculate in real time the quantity of heat input by the electron beam to each designated area so that the designated area of the powder layer is at the desired temperature at a future desired time.

In view of such situations, there have been demands for a technique to control a quantity of heat input to a designated area in a powder layer (modeled surface), using a heat source such as an electron beam, so that a temperature of the designated area is at a desired temperature at a future desired time.

A three-dimensional additive manufacturing device according to an aspect of the present invention includes: a base plate configured to move along a vertical direction; a powder feeding unit configured to laminate a powder layer including a powder sample on an upper surface of the base plate; a beam generating unit configured to generate a beam in a designated quantity of heat; and a control unit configured to control the beam generating unit to irradiate a designated position of the powder layer prepared on the base plate with the beam in a scan order programmed based on three-dimensional model data. The control unit calculates a required quantity of heat to be input to the designated position, based on heat capacity of the designated position of the powder layer, to set a temperature of the designated position at a desired temperature at a future designated time, and the control unit controls the beam generated by the beam generating unit to enable input of the required quantity of heat to the designated position.

According to at least an aspect of the present invention, a quantity of heat input to a designated area in a powder layer (modeled surface) is controlled with a heat source such as an electron beam so that a temperature of the designated area is set at a desired temperature at a future desired time. The problems, configurations, and effects other than those described above will be clarified in the following embodiments.

DETAILED DESCRIPTION

Figure 1:
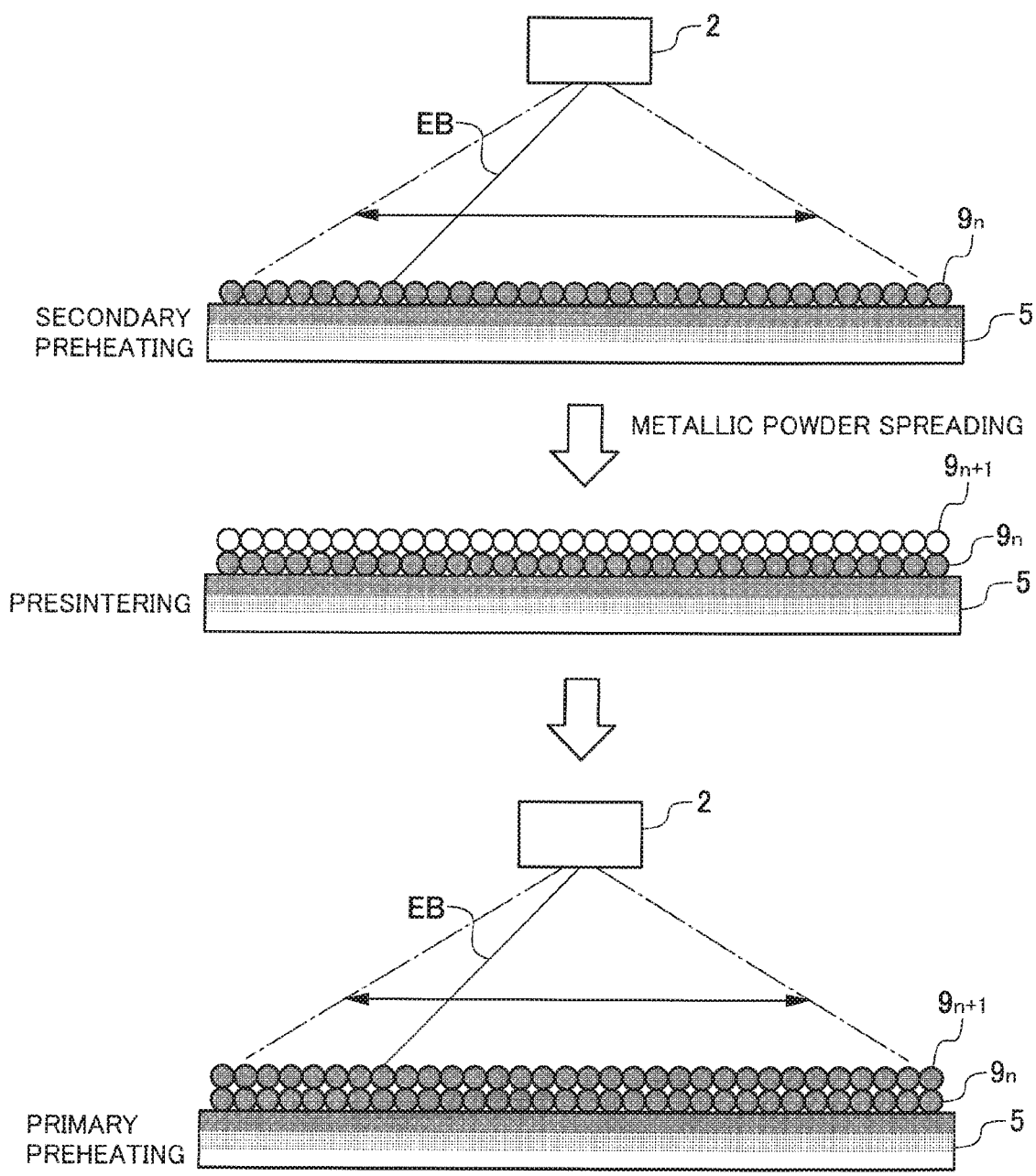
FIG. 1 is an explanatory view showing (first) steps of three-dimensional additive manufacturing based on powder sintering additive manufacturing.
Figure 2:
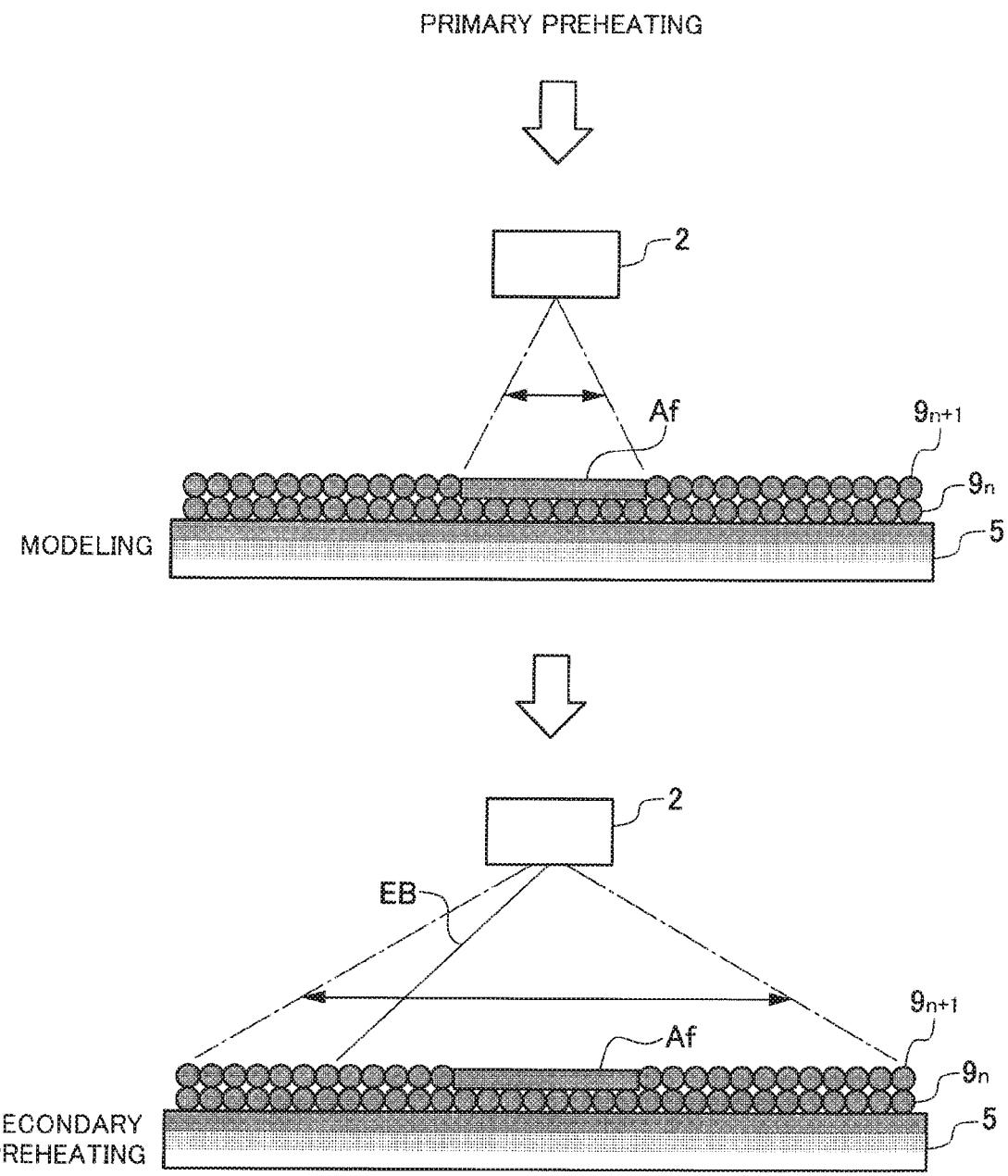
FIG. 2 is an explanatory view showing (second) steps of the three-dimensional additive manufacturing based on the powder sintering additive manufacturing.

Hereinafter, an embodiment of the present invention will be described with reference to the accompanying drawings. In the accompanying drawings, elements having substantially identical function or configuration will be denoted by the same reference numerals, and redundant explanation will be omitted.

1. First Embodiment

[Theoretical Aspect of Three-Dimensional Additive Manufacturing of First Embodiment]

Hereinafter described is a theoretical aspect of a three-dimensional additive manufacturing according to the present invention. Generally, an increase or a decrease in temperature of a substance is represented by the following Formula (1).

$$\Delta T = \frac{\Delta Q}{C} \quad (1)$$

The symbol ΔQ in Formula (1) represents the net quantity of heat given to a system, and the symbol C represents heat capacity of the system. Formula (1) shows that a temperature of the system changes by ΔT (including positive and negative). Formula (1) is rewritten as follows.

After rewriting Formula (1) as the following formula, first, the following formula is deformed to Formula (2).

$$T_{target} - T_{now} = \frac{Q_{in} - Q_{out}}{C} \quad (2)$$

$$T_{target} = T_{now} - \frac{Q_{out}}{C} + \frac{Q_{in}}{C}$$

As seen from Formula (2), when the following factors are given, a target temperature $T_{target}$ of the system (a designated area in a modeled surface in this embodiment) is determined.

Current temperature: $T_{now}$
Quantity of heat input (energy): $Q_{in}$
Loss in quantity of heat: $Q_{out}$, that is, decrease in temperature: $Q_{out}/C$
Heat capacity: C Hereinafter, the following items (1) and (2) will be explained step by step.

(1) method for obtaining heat capacity by past temperature data (2) method for calculating an operating time of secondary preheating in order to control the temperature of the system to be at "$T_{target}$"

Figure 3:
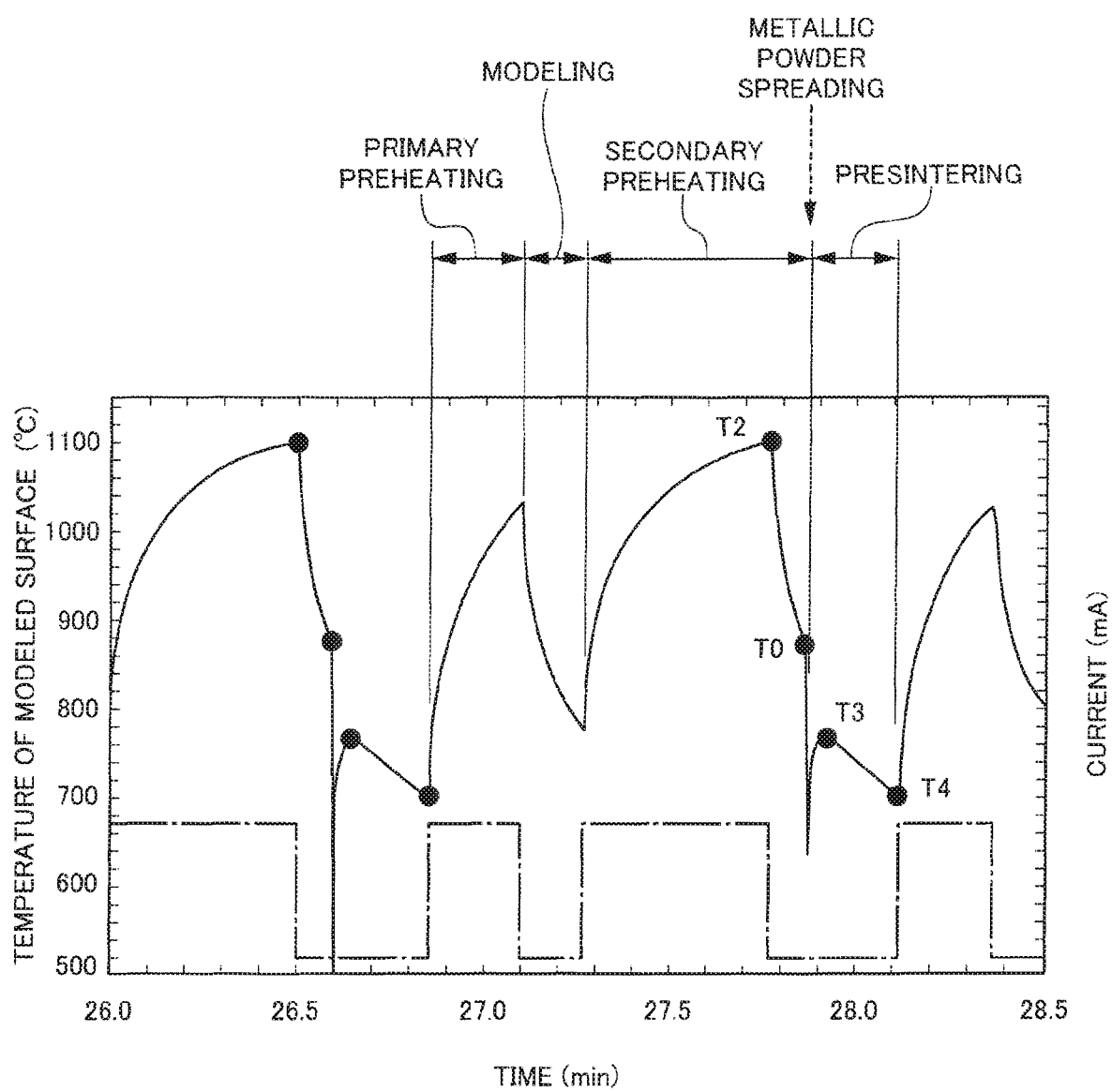
FIG. 3 is an explanatory view showing a relationship between an electron beam irradiation time and a temperature of (a designated position of) a modeled surface.
Figure 4:
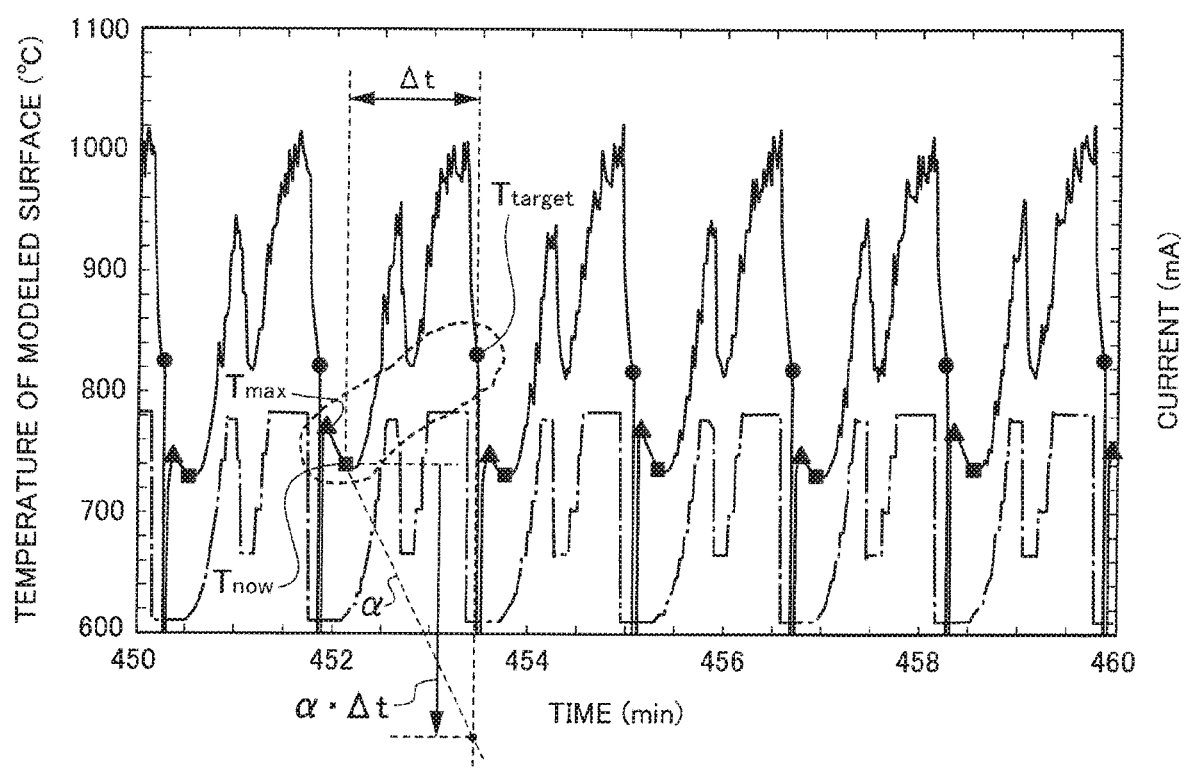
FIG. 4 is a graph showing an example of a relationship between an electron beam irradiation time and a temperature of (a designated position of) a modeled surface.

First, "(1) method for obtaining heat capacity by past temperature data" will be described with reference to FIG. 4. FIG. 4 is a graph showing an example of a relationship between an electron beam irradiation time and a temperature of (a designated position of) a modeled surface. FIG. 4 shows simulation results of changes in temperature of the modeled surface and changes in emission currents (offset on a display) during a modeling experiment. In the drawing, a circular dot indicates a temperature right before metallic powder spreading ($T_{target}$: corresponding to the target temperature T1 mentioned in the description of FIG. 3), a triangular dot indicates a maximum temperature during presintering ($T_{max}$: corresponding to T2 in FIG. 3), and a square dot indicates a temperature right before primary preheating ($T_{now}$: corresponding to T3 in FIG. 3). The following conditions [1a] to [1c] are given in order to apply the above Formula (2) to a three-dimensional additive manufacturing device according to this embodiment.

[1a] The temperature right before the metallic powder spreading is denoted by "$T_{target}$" in Formula (2), and the temperature right before the primary preheating is denoted by "$T_{now}$".

[1b] In Formula (2), the second term on the right-hand side ($Q_{out}/C$) is a term of temperature loss of the system. The slope a (° C./min or sec) is obtained from the maximum temperature during the presintering ($T_{max}$) and the temperature right before the primary preheating ($T_{now}$), and a time difference $\Delta t$ between the temperature right before the primary preheating ($T_{now}$) and the temperature right before the metallic powder spreading ($T_{target}$) is calculated. Multiplying those values gives a temperature decrease $\alpha \cdot \Delta t$ after $\Delta t$ time (corresponding to the downward arrow).

[1c] The quantity of heat input $Q_{in}$ in the third term on the right-hand side of Formula (2) is given by $V_{acc} \times \Sigma(I_j \times \tau_j)$, where $V_{acc}$ represents an acceleration voltage of an electron beam generating device 2 (also referred to as an electron gun) in FIG. 5 which is to be described later. Herein, $I_j$ represents an emission current value of an electron beam at time j, and $\tau_j$ represents an irradiation time of the emission current. Substituting these factors into Formula (2) leads to Formula (3).

$$T_{target} = T_{now} - \alpha \cdot \Delta t + \frac{Vacc \times \Sigma_i (I_i \times \tau_j)}{C} \quad (3)$$

Since the heat capacity C is unknown in Formula (3), when the heat capacity C is shifted to the left-hand side, is obtained as a numerical value based on acquired data, as shown in Formula (4).

$$C = \frac{Vacc \times \Sigma_j (I_j \times \tau_j)}{T_{target} - T_{now} + \alpha \cdot \Delta t} \quad (4)$$

Hereinafter described is "(2) method for calculating an operating time of secondary preheating in order to control the temperature of the system to be at "$T_{target}$". When modeling the next layer, assuming that the heat capacity is not greatly different from the past heat capacity, it is possible to calculate a quantity of heat input for temperature control based on the latest heat capacity, that is, a beam irradiation time at the time of the secondary preheating. The details will now be described. The following three points should be considered and carried out.

[2a] Solve $\Delta t$ in the numerator on the right-hand side of Formula (4). Consider the time of the primary preheating, the modeling, the secondary preheating, and other time or a delay time, until the onset of an event to be controlled (the secondary preheating in this embodiment).

[2b] Perceive quantities of heat input at the time of the primary preheating, the modeling, and the secondary preheating.

[2c] Acquire a value (measured value) of the maximum temperature during the presintering which has just been measured and a value of the temperature right before the primary preheating.

First, the solution of $\Delta t$ in [2a] indicates the rewriting of $\Delta t$ as Formula (5), where a beam irradiation time at the time of the primary preheating is denoted by $\Delta t_{ph}$, a beam irradiation time at the time of the modeling is denoted by $\Delta t_{am}$, a beam irradiation time at the time of the secondary preheating is denoted by $\Delta t_{ah}$, and other time or a delay time is denoted by $\Delta t_{delay}$.

$$\Delta t = \Delta t_{ph} + \Delta t_{am} + \Delta t_{ah} + \Delta t_{delay} \quad (5)$$

The last term $\Delta t_{delay}$ in Formula (5) represents the time from the stoppage of the electron beam irradiation for the secondary preheating to the time when a temperature at the stoppage of the electron beam irradiation changes to a temperature of a target event (that is, the temperature at the start of the metallic powder spreading $T_{target}$). This is a delay time influenced by a time for communicating or processing with devices (the thermometer, and the electron beam generating device) through a programmable logic controller (PLC) or the like, and a numerical value of the delay time is obtained in advance.

In regard to the quantity of heat input $Q_{in}$, $V_{acc} \times \Sigma_j (I_j \times \tau_j)$ is applied to a quantity of heat at the time of the primary preheating $Q_{ph}$ and a quantity of heat at the time of the modeling $Q_{am}$. At the time of the secondary preheating, when the emission current value within the beam irradiation time is constant at $I_{ah}$, the above formula is expressed as $V_{acc} \times I_j \Sigma_j(\tau_j)$, and the quantity of heat input $Q_{in}$ is expressed by the following Formula (6). The third term on the right-hand side of Formula (6), $V_{acc} \times I_{ah} \times \Delta t_{ah}$ corresponds to a quantity of heat $Q_{ah}$.

$$Q_{in} = Q_{ph} + Q_{am} + Vacc \times I_{ah} \times \Delta t_{ah} \quad (6)$$

The quantities of heat input at the time of the primary preheating and at the time of the modeling are written as $Q_{xx}$, because an irradiation pattern of the electron beam is almost determined in the primary preheating after the presintering so that the beam irradiation time $\Delta t_{ph}$ and the quantity of heat input $Q_{ph}$ are estimated in advance, and furthermore, the beam irradiation time at the time of the modeling $\Delta t_{am}$ and the quantity of heat input $Q_{am}$ are also calculated in advance inside a computer (a modeling control device 30).

Substituting Formulae (5) and (6) into Formula (3) leads to Formula (7).

$$T_{target} = T_{now} - \alpha \cdot (\Delta t_{ph} + \Delta t_{am} + \Delta t_{ah} + \Delta t_{delay}) + \quad (7)$$
$$\frac{Q_{ph} + Q_{am} + Vacc \times I_{ah} \times \Delta t_{ah}}{C}$$

Of course, the temperature at the start of the metallic powder spreading "$T_{target}$" is to be controlled at a constant value. Therefore, an unknown value herein is the beam irradiation time at the time of the secondary preheating "$\Delta t_{ah}$". Formula (7) is deformed to obtain Formula (8).

$$\Delta t_{ah} = \frac{C\{T_{target} - T_{now} + \alpha \cdot (\Delta t_{ph} + \Delta t_{am} + \Delta t_{delay})\} - (Q_{ph} + Q_{am})}{Vacc \times I_{ah} \; \alpha \times C} \quad (8)$$

In this manner, the electron beam irradiation time at the time of the secondary preheating $\Delta t_{ah}$ is obtained. The three-dimensional additive manufacturing device according to the present embodiment determines the electron beam irradiation time at the time of the secondary preheating based on Formula (8) and adjusts the quantity of heat input (heat input energy).

[Configuration of Three-Dimensional Additive Manufacturing Device]

Figure 5:
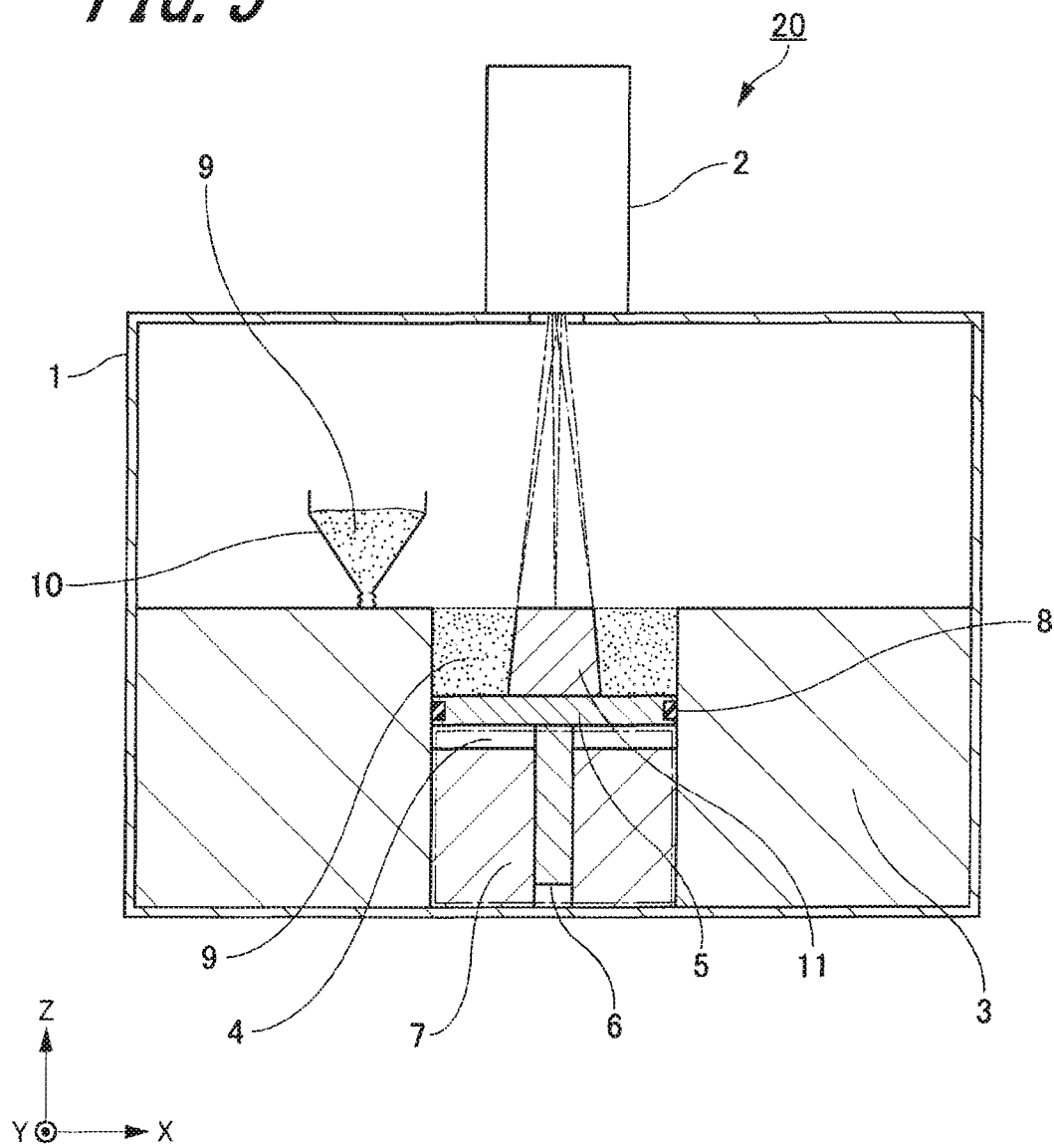
FIG. 5 is a schematic cross-sectional view showing an exemplary configuration of a three-dimensional additive manufacturing device according to a first embodiment of the present invention.

Referring to FIG. 5, hereinafter described is the configuration of the three-dimensional additive manufacturing device to which the aforementioned three-dimensional additive manufacturing is applied. FIG. 5 is a schematic cross-sectional view showing an exemplary configuration of the three-dimensional additive manufacturing device according to the first embodiment. In FIG. 5, a moving direction (vertical direction) of a base plate 5 of a three-dimensional additive manufacturing device 20 is referred to as the Z direction, a first direction perpendicular to the Z direction is referred to as the X direction, and a second direction perpendicular to the Z direction and the X direction is referred to as the Y direction.

Figure 7:
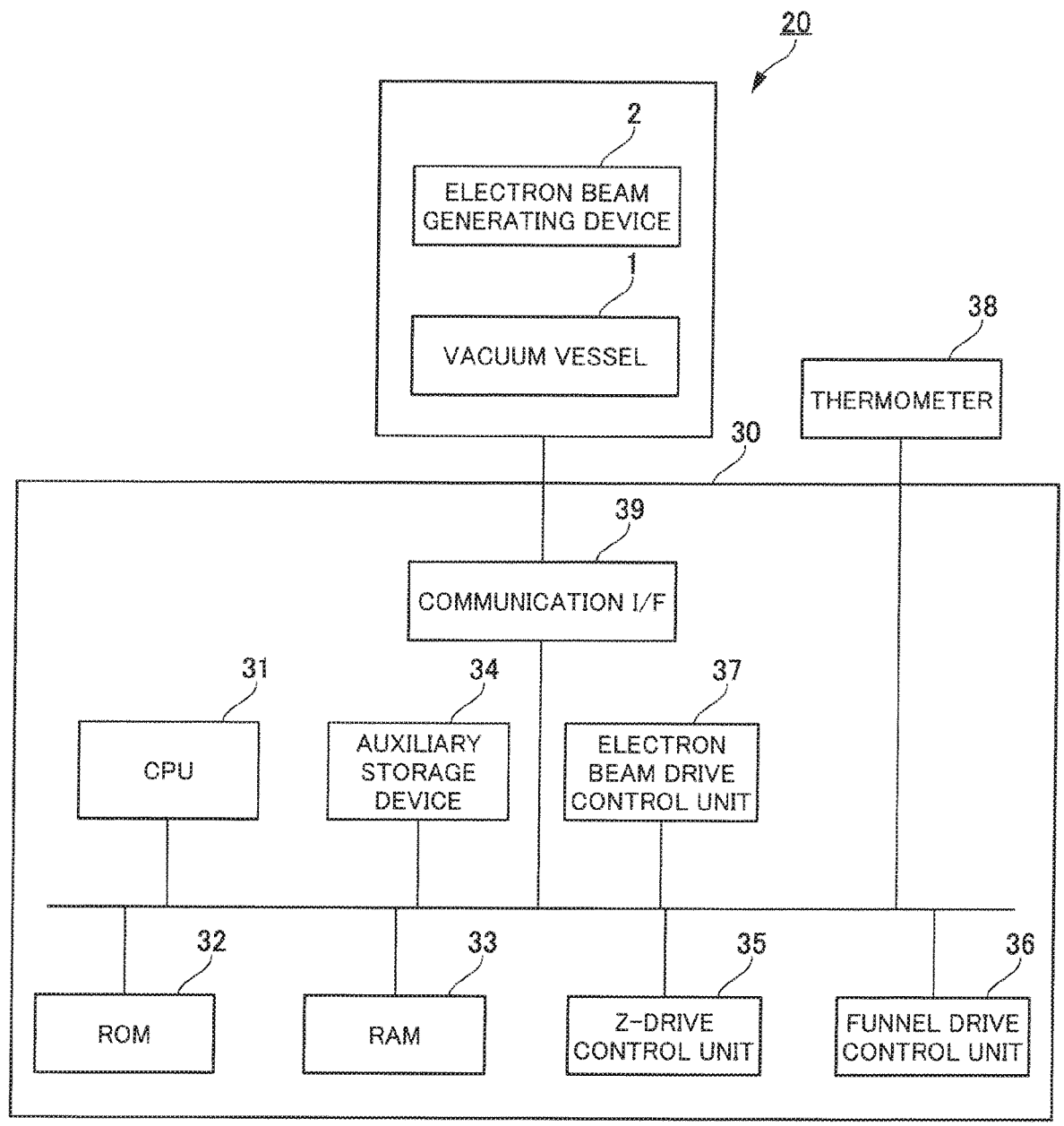
FIG. 7 is a block diagram showing a control system of the three-dimensional additive manufacturing device according to the first embodiment of the present invention.

The three-dimensional additive manufacturing device 20 shown in FIG. 5 includes a vacuum vessel 1, an electron beam generating device 2 (an example of a beam generating unit), and a modeling control device 30 (to be described later, see FIG. 7). The electron beam generating device 2 is mounted on an upper part of the vacuum vessel 1. Inside the vacuum vessel 1, a linearly-supply funnel 10 (an example of a powder feeding unit) filled with a metallic powder 9 and a cylindrical modeling underframe 3 are provided. A central part of the modeling underframe 3 is provided with a pit 4. An upper part of the pit is provided with the base plate 5 to which a Z-shaft 6 is connected. A lower part of the pit 4 is provided with a Z-drive mechanism 7 that drives the Z-shaft 6 in the Z direction. In the Z-drive mechanism 7, for example, a rack & pinion, and a ball screw may be used.

A side end portion of the base plate 5 is provided with a seal member 8 having heat resistance and flexibility. The base plate 5 moves in the Z direction when the seal member 8 slides along the inner surface of the modeling underframe 3. An internal atmosphere of the vacuum vessel 1 is evacuated by an unshown vacuum pump so that the interior side of the vacuum vessel 1 is maintained vacuum. Alternatively, the internal atmosphere of the vacuum vessel 1 which is close to a vacuum state may be filled with an inert gas such as helium gas.

At the start of the three-dimensional additive manufacturing by the three-dimensional additive manufacturing device 20, the electron beam generating device 2 emits the electron beam so that the base plate 5 and the peripheral atmosphere are preheated (for example, at 700° C. or more) ("secondary preheating"). When the Z-shaft 6 is driven by the Z-drive mechanism 7, the base plate 5 is disposed at a position lower by $\Delta Z$ in the Z direction than an upper surface of the modeling underframe 3. The linearly-supply funnel 10 filled with the metallic powder 9 moves along the upper surface (the left side in FIG. 5) of the modeling underframe 3 toward the upper surface of the modeling underframe 3 in the opposite side across the base plate 5 (the right side in FIG. 5). Accordingly, the metallic powder 9 is spread over the base plate 5, and a powder layer (modeled surface) having a thickness of $\Delta Z$ is formed on the base plate 5.

The surface temperature of the modeled surface including the spread metallic powder 9 (the base plate 5 for the first time, and the powder layer from the second time) is preheated by the secondary preheating so that the metallic powder 9 on the modeled surface is presintered ("presintering").

Next, the electron beam generating device 2 of the three-dimensional additive manufacturing device 20 irradiates the whole area of the powder layer including the presintered metallic powder 9 with the electron beam and heats the modeled surface up to a desired temperature ("primary preheating"). In the first (and second) preheating, the electron beam generating device 2 emits the electron beam, for example, at a pitch (scanning speed) of 2 to 3 ρs. Depending on the situation, the focus of a beam spot of the electron beam may be blurred.

Next, according to preliminarily prepared two-dimensional information (slice data) which is obtained by slicing a model in design data at $\Delta Z$ intervals, a model forming area (designated area in the modeled surface) of the powder layer (presintered body) on the base plate 5 is irradiated with the electron beam ("modeling"). The electron beam emitted from the electron beam generating device 2 melts the metallic powder in the two-dimensional model forming area. This process is called "primary melting". The melted metallic powder 9 is solidified by lapse of predetermined time depending on the material. In the modeling, the model forming area of the powder layer is locally irradiated with the electron beam so that the temperature of the powder layer apart from the model forming area decreases.

In the modeling, after a single layer of the metallic powder 9 in the two-dimensional model forming area is melted, the single layer of the metallic powder 9 is solidified, and then, the Z-drive mechanism 7 moves the base plate 5 downward by $\Delta Z$. Next, after the whole area of the latest spread powder layer (modeled surface) is irradiated with the electron beam by the secondary preheating, the metallic powder 9 having a thickness of $\Delta Z$ is spread over the whole area of the latest spread powder layer (lower layer). Then, the primary preheating and the modeling are performed. Repeating a series of these steps and laminating layers of the melted and solidified metallic powder 9 produce a three-dimensional model 11 (an example of a "three-dimensional structure").

Figure 6:
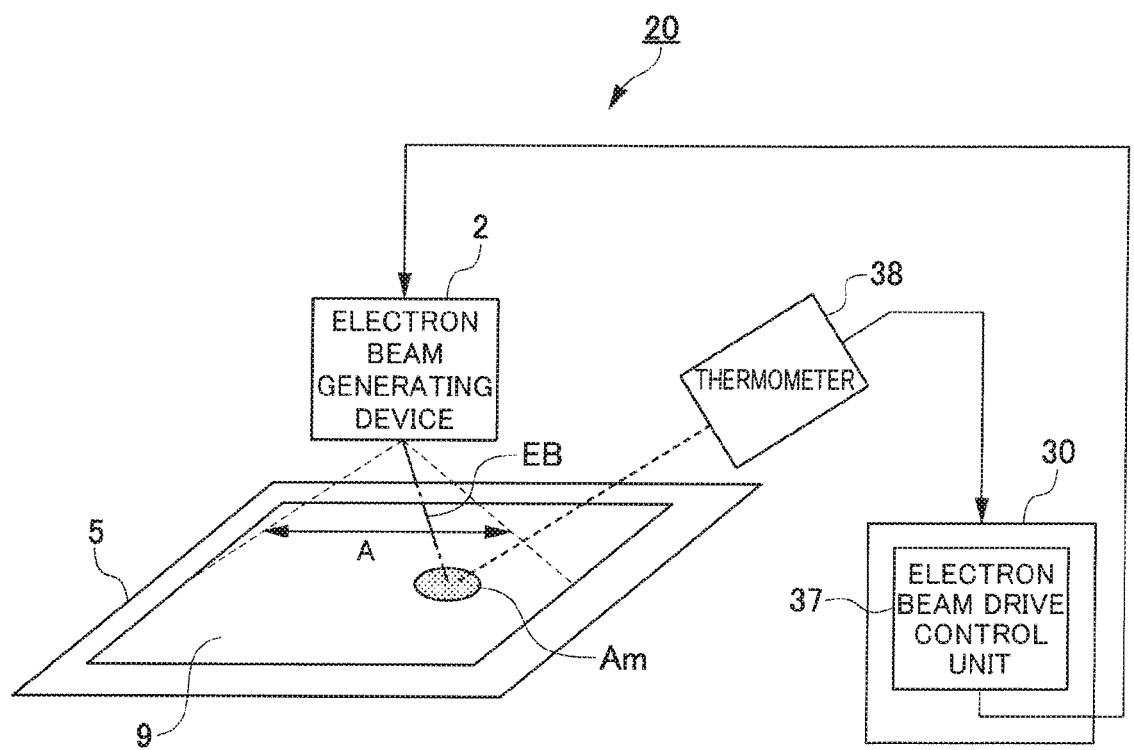
FIG. 6 is a schematic configuration diagram showing a system that controls a quantity of heat input by an electron beam of the three-dimensional additive manufacturing device according to the first embodiment of the present invention.

Referring to FIG. 6, hereinafter described is a mechanism for controlling a quantity of heat input by the electron beam of the three-dimensional additive manufacturing device 20 (electron beam generating device 2). FIG. 6 is a schematic configuration diagram showing a mechanism for controlling a quantity of heat input by the electron beam EB of the three-dimensional additive manufacturing device 20 (electron beam generating device 2).

As shown in FIG. 6, a thermometer 38 is disposed in the three-dimensional additive manufacturing device 20. The thermometer 38 measures the temperature of a temperature measurement area Am which is a finite area in a modeled surface. The thermometer 38 measures the temperature of the designated area in the modeled surface (the uppermost powder layer) at each sampling time. The modeling control device 30 including a computer reads an output (measurement result) of the thermometer 38. Examples of the thermometer 38 include a radiation thermometer that measures radiation from a black body, and an infrared thermometer that measures infrared rays. The thermometer 38 may be disposed inside the vacuum vessel 1. Alternatively, the thermometer 38 may be disposed outside the vacuum vessel 1 from the aspect of controlling contamination attributed to the metallic powder 9.

Using the measurement result of the thermometer 38, the electron beam drive control unit 37 of the modeling control device 30 controls a quantity of heat (energy) of the electron beam EB emitted from the electron beam generating device 2 to the designated area in the modeled surface. The electron beam drive control unit 37 will be described later in detail with reference to FIG. 8.

Next, a control system (the modeling control device 30) of the three-dimensional additive manufacturing device 20 will be described. FIG. 7 is a block diagram showing the control system (modeling control device 30) of the three-dimensional additive manufacturing device 20.

The three-dimensional additive manufacturing device 20 includes the modeling control device 30 which is electrically connected to the electron beam generating device 2. The modeling control device 30 includes a central processing unit (CPU) 31, a read only memory (ROM) 32, a random access memory (RAM) 33, an auxiliary storage unit 34, a Z-drive control unit 35, a funnel drive control unit 36, the electron beam drive control unit 37, and a communication interface (described as "communication I/F" in FIG. 7) 39. The CPU 31 is connected to each unit through a system bus so as to transmit and/or receive data to and from each unit.

The CPU 31 (an example of a control unit) is included in a computer together with the ROM 32 and the RAM 33. The CPU 31 reads out a modeling program stored in the ROM 32 to the RAM 33 and controls processes and operations of each unit according to the modeling program. Based on three-dimensional model data, the CPU 31 causes the electron beam generating device 2 to irradiate each designated position of the powder layer that includes the metallic powder 9 and is prepared on the base plate 5 (in a programmed scan order) with the electron beam.

The ROM 32 is a nonvolatile storage unit that stores, for example, the modeling program executed by the CPU 31, and parameters (additively manufactured model data 34a) of the model (see FIG. 5). The RAM 33 is a volatile storage unit that temporarily stores data and is used as a workspace. Data such as the modeling program stored in the ROM 32 and the parameters of the model 11 may be stored in a nonvolatile mass storage device (the auxiliary storage unit 34).

The Z-drive control unit 35 controls the operation of the Z-drive mechanism 7 (see FIG. 5) under the control of the CPU 31. The funnel drive control unit 36 controls the operation of the linearly-supply funnel 10 (see FIG. 5) under the control of the CPU 31.

Under the control of the CPU 31, the electron beam drive control unit 37 (an example of the control unit) controls irradiation energy (acceleration voltage, emission current, irradiation time) and irradiation positions of the electron beam emitted from the electron beam generating device 2.

The communication interface 39 transmits and receives information according to a predetermined format over a communication network which is not shown. Examples of the communication interface 39 include a network interface card (NIC) and a serial interface which are not shown.

[Internal Configuration of Electron Beam Drive Control Unit 37]

Figure 8:
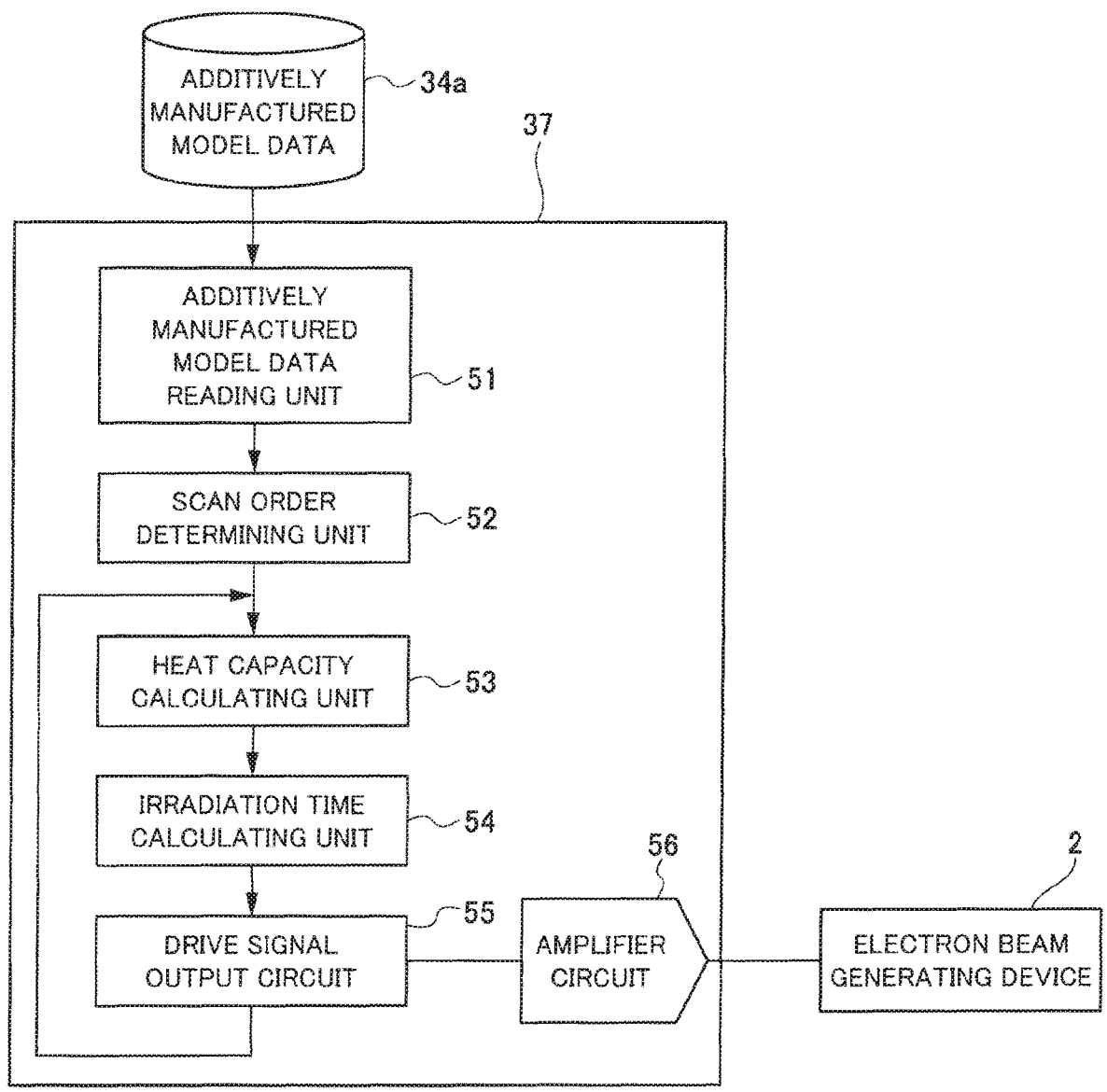
FIG. 8 is a block diagram showing an exemplary internal configuration of an electron beam drive control unit according to the first embodiment of the present invention.

Referring to FIG. 8, hereinafter described is an internal configuration of the electron beam drive control unit 37 of the modeling control device 30. FIG. 8 is a block diagram showing an exemplary internal configuration of the electron beam drive control unit 37.

The electron beam drive control unit 37 includes an additively manufactured model data reading unit 51, a scan order determining unit 52, a heat capacity calculating unit 53, an irradiation time calculating unit 54, a drive signal output circuit 55, and an amplifier circuit 56.

The additively manufactured model data reading unit reads the additively manufactured model data 34a stored in the ROM 32 or the auxiliary storage unit 34 through the system bus.

The scan order determining unit 52 programs and determines a scan order (irradiation order) of the electron beam generated by the electron beam generating device 2 with respect to the powder layer.

The heat capacity calculating unit 53 calculates the heat capacity of each designated position (irradiation point) of the powder layer (modeled surface) based on the above Formula (4) and outputs calculation results to the irradiation time calculating unit 54.

Based on the heat capacity of each designated position of the powder layer (modeled surface) input from the heat capacity calculating unit 53, the irradiation time calculating unit 54 calculates a required quantity of heat to be input to each designated position so that a temperature at each designated position is set at the desired temperature at a future designated time.

The drive signal output circuit 55 outputs a drive signal to the electron beam generating device 2 according to the scan order set by the scan order determining unit 52. At this time, the drive signal output circuit 55 generates the drive signal based on the electron beam irradiation time calculated by the irradiation time calculating unit 54 with respect to each designated position so that the required quantity of heat is input to each designated position.

The amplifier circuit 56 amplifies the drive signal output from the drive signal output circuit 55 and supplies the drive signal to an unshown electron optical system (scanning deflection circuit) of the electron beam generating device 2.

The electron beam generating device 2 deflects the electron beam based on the drive signal supplied from the amplifier circuit 56, scans the modeled surface with the electron beam according to the scan order set by the scan order determining unit 52, and inputs the required quantity of heat to each designated position.

[Operation of Three-Dimensional Additive Manufacturing Device]

Figure 9:
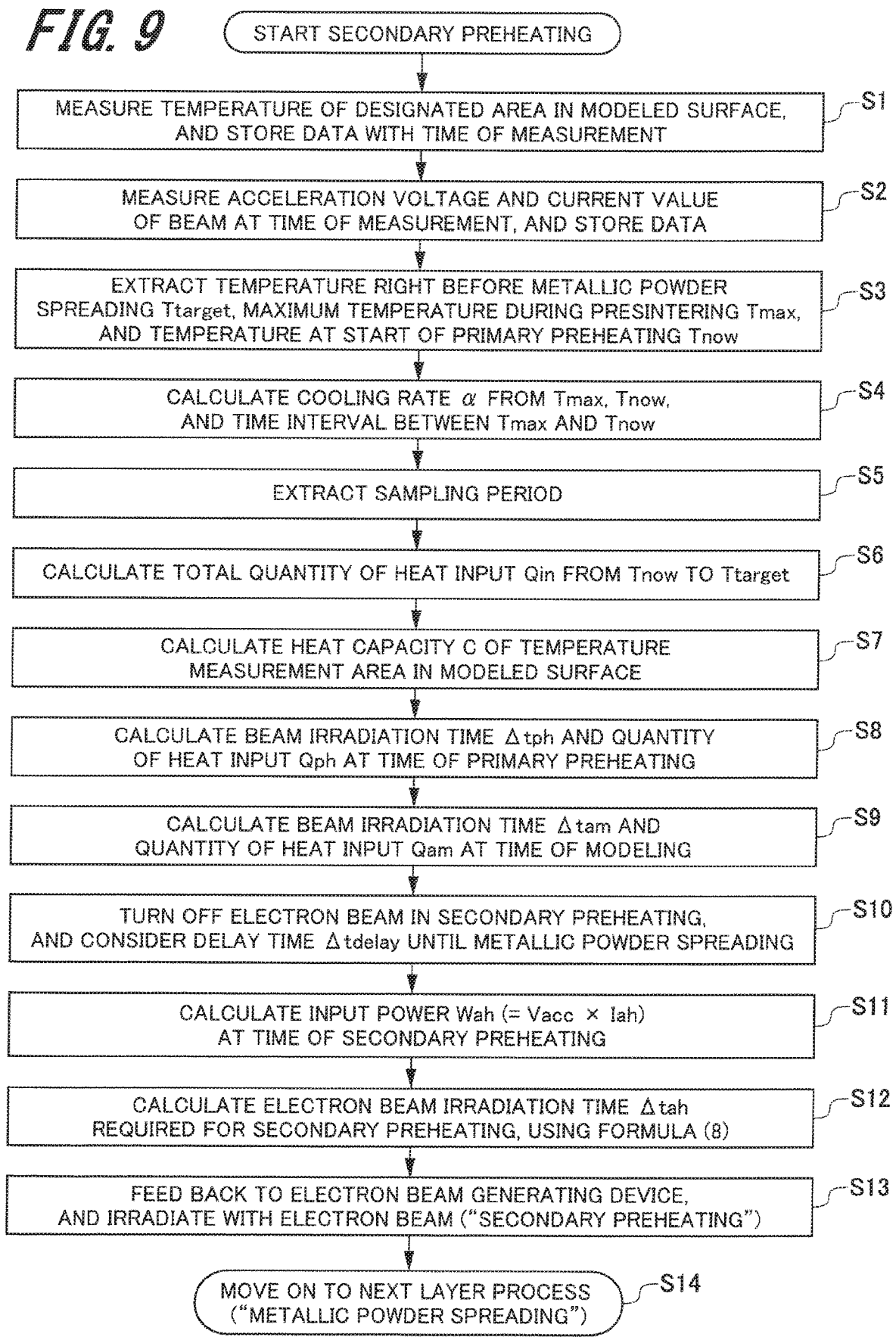
FIG. 9 is a flowchart showing exemplary steps of secondary preheating of the three-dimensional additive manufacturing device according to the first embodiment of the present invention.

Referring to FIG. 9, hereinafter described are steps of the secondary preheating (controlling the temperature right before the metallic powder spreading) of the three-dimensional additive manufacturing device 20. FIG. 9 is a flowchart showing exemplary steps of the secondary preheating of the three-dimensional additive manufacturing device 20 (electron beam drive control unit 37). For example, the electron beam drive control unit 37 executes the program stored in the ROM 32 and follows the steps of the secondary preheating shown in FIG. 9.

As already explained, in the three-dimensional additive manufacturing according to the present embodiment, the steps of "metallic powder spreading" →"presintering" →"primary preheating" →"modeling" →"secondary preheating" →"metallic powder spreading" are repeated, and the thermometer 38 measures the temperature of the temperature measurement area Am (see FIG. 6) in the modeled surface (the uppermost powder layer) at each sampling time. As a premise, the additively manufactured model data reading unit 51 (see FIG. 8) of the electron beam drive control unit 37 reads the additively manufactured model data 34a of an n-th layer of interest (herein, the first layer) from the ROM 32 or the auxiliary storage unit 34. Next, the scan order determining unit 52 programs and determines the scan order (irradiation order) of the electron beam with respect to the powder layer of the n-th layer of interest (the first layer).

The heat capacity calculating unit 53 of the electron beam drive control unit 37 successively measures, with the thermometer 38, the temperature of the designated area in the modeled surface and records measured data, for example, in the auxiliary storage unit 34 together with the time of measurement (S1).

The heat capacity calculating unit 53 measures an output of the electron beam emitted on the modeled surface at the same time as the time of measurement of the thermometer 38. Specifically, the heat capacity calculating unit 53 measures the acceleration voltage and the emission current value and records measured data together with the time of measurement, for example, in the auxiliary storage unit 34 (S2).

The heat capacity calculating unit 53 extracts the temperature right before the metallic powder spreading $T_{target}$, the maximum temperature during the presintering $T_{max}$, and the temperature right before the primary preheating (at the start of the primary preheating) $T_{now}$ from time-series data of the temperatures of the modeled surface accumulated in the auxiliary storage unit 34 (S3).

The heat capacity calculating unit 53 calculates a cooling rate a based on the time-series data accumulated in the auxiliary storage unit 34, using the maximum temperature during the presintering $T_{max}$, the temperature right before the primary preheating $T_{now}$, and the time interval $\Delta t$ between those two temperatures (S4).

Next, the heat capacity calculating unit 53 extracts a sampling period, that is, a measurement time interval of the thermometer 38 (S5).

Next, the heat capacity calculating unit 53 calculates the total quantity of heat input $Q_{in}$ from the time right before the primary preheating to the time when the temperature right before the primary preheating $T_{now}$ changes to the temperature right before the metallic powder spreading $T_{target}$ (from the start time of the primary preheating to the time right before the metallic powder spreading, including the modeling) (S6).

Next, the heat capacity calculating unit 53 calculates the heat capacity C of the temperature measurement area Am (FIG. 6) in the modeled surface by Formula (4) (S7).

Next, the irradiation time calculating unit 54 of the electron beam drive control unit 37 calculates an execution time of the primary preheating (beam irradiation time $\Delta t_{ph}$) and the total quantity of heat input in the primary preheating $Q_{ph}$ (S8). The quantity of heat input in the primary preheating $Q_{ph}$ is given by multiplying the acceleration voltage $V_{acc}$, the emission current $I_{ph}$, and the beam irradiation time $\Delta t_{ph}$.

On completion of the metallic powder spreading, the operating time of the subsequent steps, that is, presintering, primary preheating, and modeling, usually takes several tens of seconds. Using this time, it is desirable to calculate the quantity of heat required for the secondary preheating with respect to the designated area.

The quantity of heat is not input by the electron beam during the presintering. The irradiation time calculating unit 54 calculates the execution time at the time of the modeling (beam irradiation time $\Delta t_{am}$) and the total quantity of heat input at the time of the modeling $Q_{am}$ (S9). The quantity of heat input at the time of the modeling $Q_{am}$ is determined in advance. Therefore, with a constant value of (acceleration voltage $V_{acc}$)×(emission current $I_{ah}$), the beam irradiation time at the time of the modeling $\Delta t_{am}$ and the total quantity of heat input at the time of the modeling $Q_{am}$ are also calculated with ease (S9).

Next, the irradiation time calculating unit 54 calculates the delay time $\Delta t_{delay}$, a time from when the electron beam is turned off in the secondary preheating to the time of the metallic powder spreading (S10). Since this delay time $\Delta t_{delay}$ is related to the three-dimensional additive manufacturing device 20 as described above, the delay time $\Delta t_{delay}$ is estimated in advance.

Next, the irradiation time calculating unit 54 calculates the power input $W_{ah}$ (=$V_{acc} \times I_{ah}$) of the secondary preheating (S11). With the constant acceleration voltage $V_{acc}$ and the constant emission current value $I_{ah}$ of the electron beam, the quantity of heat input in the secondary preheating $Q_{ah}$ is generally controlled by changing the irradiation time $\Delta t_{ah}$. Therefore, in the present embodiment, the former two values, that is, the acceleration voltage $V_{acc}$ and the emission current value $I_{ah}$, are assumed to be fixed values.

Next, using Formula (8), the irradiation time calculating unit 54 calculates the electron beam irradiation time $\Delta t_{ah}$ required for the secondary preheating (S12). Formula (8) is a very simple math formula and is solved instantaneously by any recent computer.

Next, the irradiation time calculating unit 54 supplies, to the drive signal output circuit 55, information of the electron beam irradiation time $\Delta t_{ah}$ required for the secondary preheating and feedbacks (reflects) the information to the electron beam emitted from the electron beam generating device 2 (S13). The electron beam generating device 2 deflects the electron beam based on the drive signal supplied from the modeling control device 30 (electron beam drive control unit 37), scans the modeled surface with the electron beam according to the scan order set by the scan order determining unit 52, and inputs the required quantity of heat to each designated area ("secondary preheating").

On completion of the secondary preheating in step S13, the electron beam drive control unit 37 moves on to the subsequent layer process, that is, another step of metallic powder spreading (S14).

As described above, in the present embodiment, heat capacity of a measurement area in a modeled surface is obtained as an absolute value by simple calculation of a temperature, a quantity of heat input, and heat loss of the measurement area, and an absolute value of electron beam irradiation amount is calculated by setting temperature distribution of the modeled surface to desired temperature distribution, for example, setting the temperature right before the metallic powder spreading $T_{target}$ at a desired temperature at a future desired time. If the acceleration voltage and the emission current value are given, the electron beam irradiation time is calculated.

Experimental Result

Figure 10A:
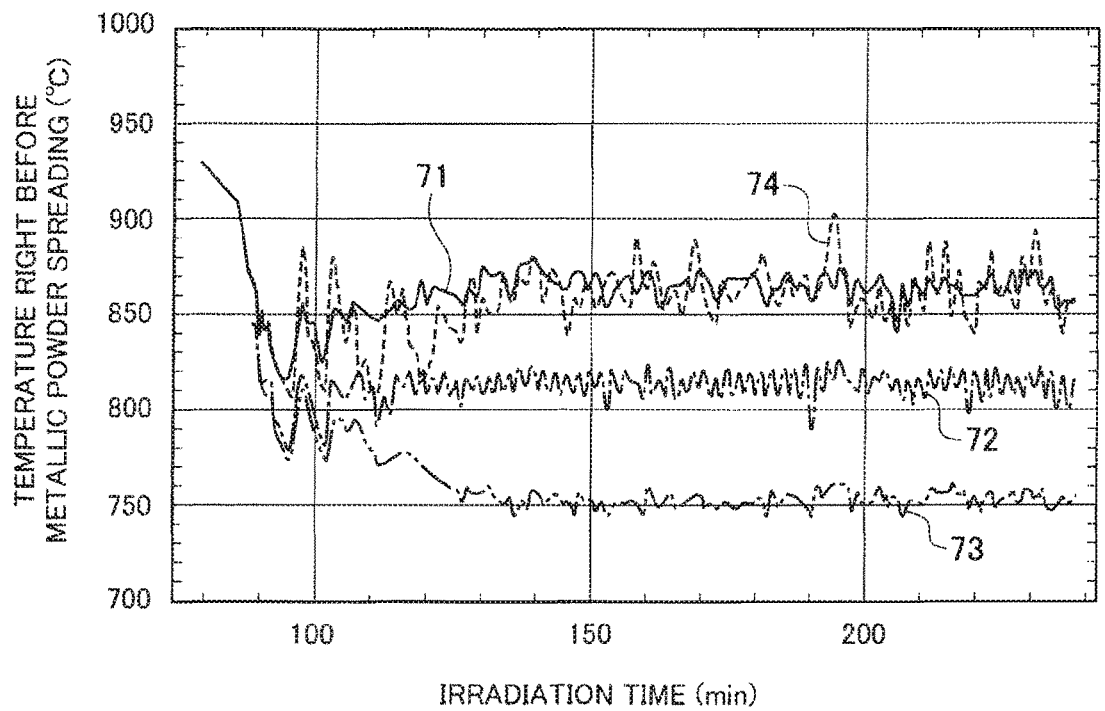
FIG. 10A is a graph showing an example of a relationship between the electron beam irradiation time and a temperature right before metallic powder spreading.
Figure 10B:
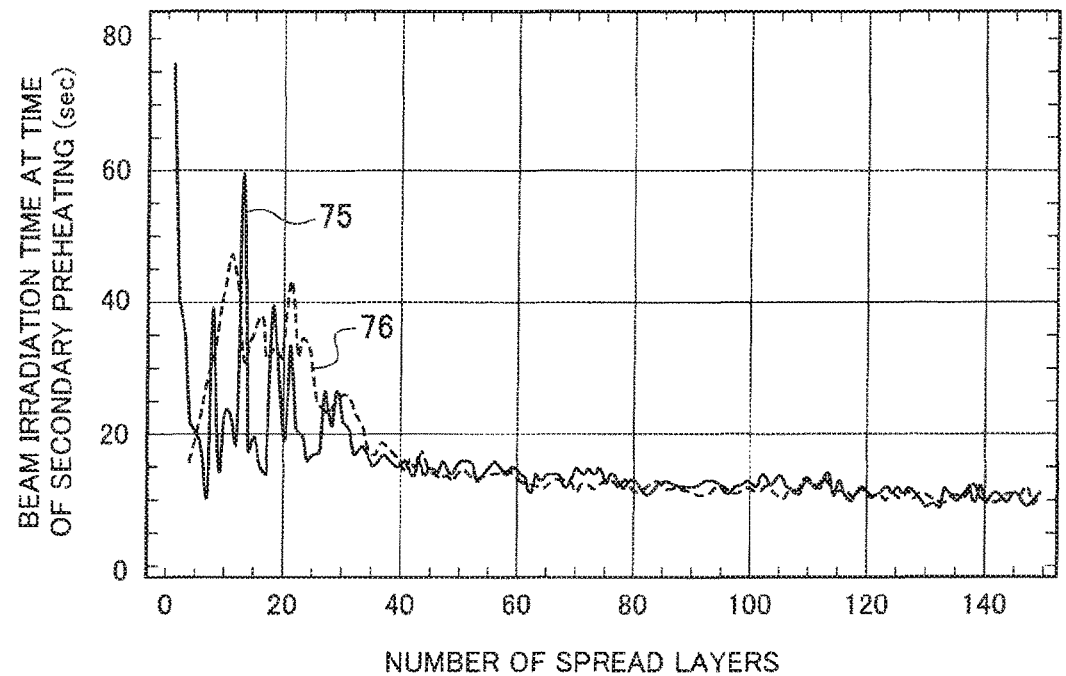
FIG. 10B is a graph showing a relationship between the number of spread layers and the electron beam irradiation time at the time of the secondary preheating.

Referring to FIG. 10, hereinafter described is results of expected values of the temperature right before the metallic powder spreading and expected values of the beam irradiation time at the time of the secondary preheating calculated by the aforementioned method of three-dimensional additive manufacturing. FIG. 10A is a graph showing an example of a relationship between the elapsed time from the start of the three-dimensional additive manufacturing and the temperature right before the metallic powder spreading; and FIG. 10B is a graph showing a relationship between the number of spread layers and the electron beam irradiation time at the time of the secondary preheating.

FIG. 10A shows results of the temperature right before the metallic powder spreading $T_{target}$ expected from Formula (7) based on the time-series data of temperatures of the modeled surface measured at the time of actual three-dimensional additive manufacturing and based on the emission current value of the electron beam. In FIG. 10A, the elapsed time from the start of the three-dimensional additive manufacturing is taken along the abscissa, and the temperature right before the metallic powder spreading is taken along the ordinate.

In FIG. 10A, a curve 71 represents time-series data of a measured value (experimental value) of the temperature right before the metallic powder spreading $T_{target}$, a curve 72 represents time-series data of the maximum temperature during the presintering $T_{max}$, a curve 73 represents time-series data of a measured value of the temperature right before the primary preheating $T_{now}$, and a curve 74 represents a simulation result (expected value) of the temperature right before the metallic powder spreading $T_{target}$. As seen from FIG. 10A, the degree of coincidence between the experimental value and the expected value is high in the temperature right before the metallic powder spreading $T_{target}$. In particular, as the elapsed time from the start of the three-dimensional additive manufacturing increases, the degree of coincidence between the experimental value and the expected value becomes high, indicating that a temperature of a future modeled surface is controlled with the data obtained by the three-dimensional additive manufacturing in the past (of the lower layer).

FIG. 10B is a graph prepared by estimating the length of the actual electron beam irradiation time $\Delta t_{ah}$, using Formula (8), based on the data obtained by the three-dimensional additive manufacturing in the past (of the lower layer) and the temperature right before the metallic powder spreading $T_{target}$ measured by the thermometer 38. In FIG. 10B, a curve 75 represents time-series data of a measured value (experimental value) of the temperature right before the metallic powder spreading $T_{target}$, and a curve 76 represents time-series data of a simulation result (expected value) of the temperature right before the metallic powder spreading $T_{target}$. Even in a case shown in FIG. 10B, the degree of coincidence between the experimental value and the expected value is high in the temperature right before the metallic powder spreading $T_{target}$. In particular, as the number of spread layers (laminated layers) increases, the degree of coincidence between the experimental value and the expected value becomes high, indicating that a temperature of a future modeled surface is controlled with the data obtained by the three-dimensional additive manufacturing in the past (of the lower layer).

According to the first embodiment, the present applicants have invented a method for measuring a temperature of a modeled surface (designated area) at the time of each process involved in the three-dimensional additive manufacturing and a method for analyzing time-series data including recorded electron beam irradiation energy, which derives heat capacity of the modeled surface. Furthermore, the present applicants have invented a method for calculating, in advance in real time, conditions for irradiation with an electron beam (for example, beam irradiation time when input power is kept constant) for setting the temperature of the modeled surface (designated area) at a desired temperature at a future desired time, using the heat capacity and a heat loss rate obtained from the time-series data of temperatures of the modeled surface.

As a result, in the first embodiment, for example, the beam irradiation time is calculated as a condition for irradiation with the electron beam, which enables input of a required quantity of heat to the modeled surface (designated area) in the secondary preheating after the modeling. Accordingly, a sintering temperature (the temperature of the modeled surface) is controlled at the time of spreading new metallic powder, which leads to achievement of an environment for the three-dimensional additive manufacturing which contributes to reduction of heat stress and heat strain (stabilization of a crystal phase) of a metallic model.

Therefore, according to the first embodiment, a quantity of heat input to a designated area in a powder layer (modeled surface) is controlled with a heat source such as an electron beam so that a temperature of the designated area is set at a desired temperature at a future desired time.

2. Second Embodiment

In place of the thermometer 38 of the first embodiment which employs a radiation thermometer for measuring a relatively small area, a second embodiment employs a wide-area thermometer 38A (see FIG. 11 to be described later) that measures a wider area than the thermometer 38.

Figure 11:
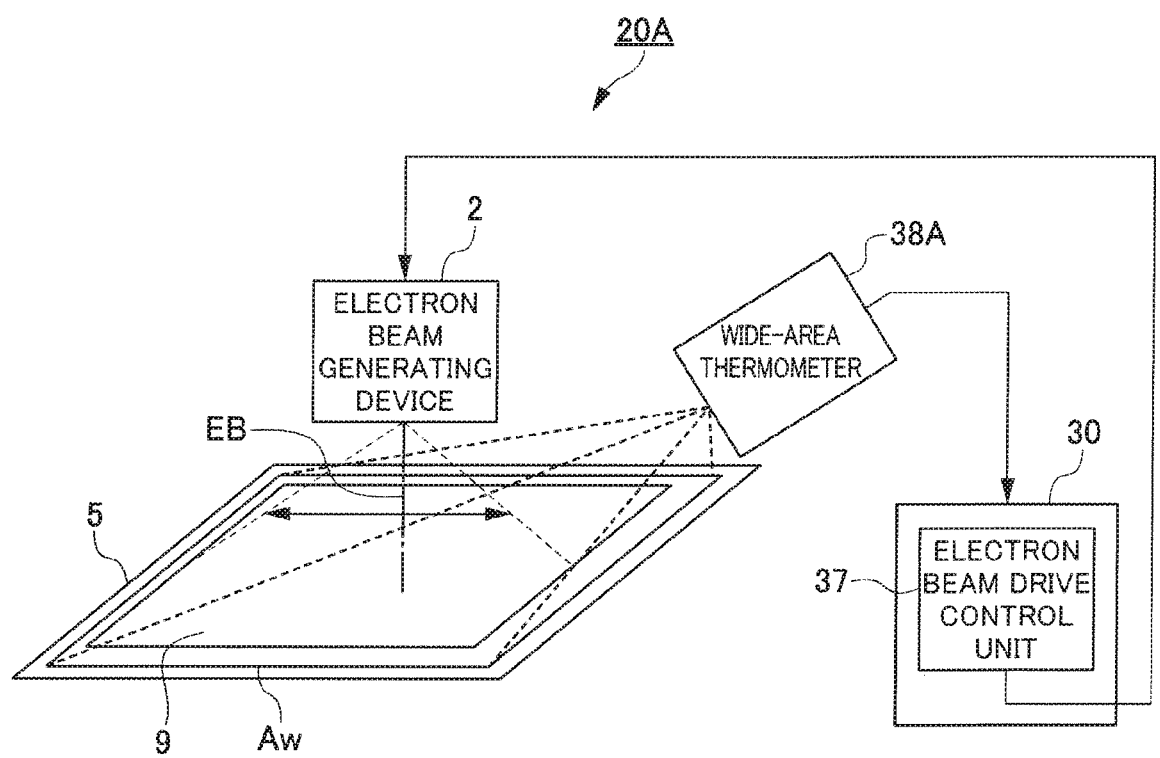
FIG. 11 is a schematic configuration diagram showing a system that controls a quantity of heat input by an electron beam of a three-dimensional additive manufacturing device according to a second embodiment of the present invention.

FIG. 11 is a schematic configuration diagram showing a system that controls a quantity of heat input by an electron beam of a three-dimensional additive manufacturing device according to the second embodiment. As shown in FIG. 11, a three-dimensional additive manufacturing device 20A includes the wide-area thermometer 38A (two-dimensional thermometer) that measures a temperature of the whole area Aw (the entire region) of a modeled surface. The wide-area thermometer 38A measures the temperature of the whole area Aw of the modeled surface at each sampling time. A modeling control device 30 including a computer reads an output (measurement result) of the wide-area thermometer 38A. An example of the wide-area thermometer 38A includes a radiant temperature camera. The wide-area thermometer 38A is disposed inside or outside a vacuum vessel 1.

Figure 12:
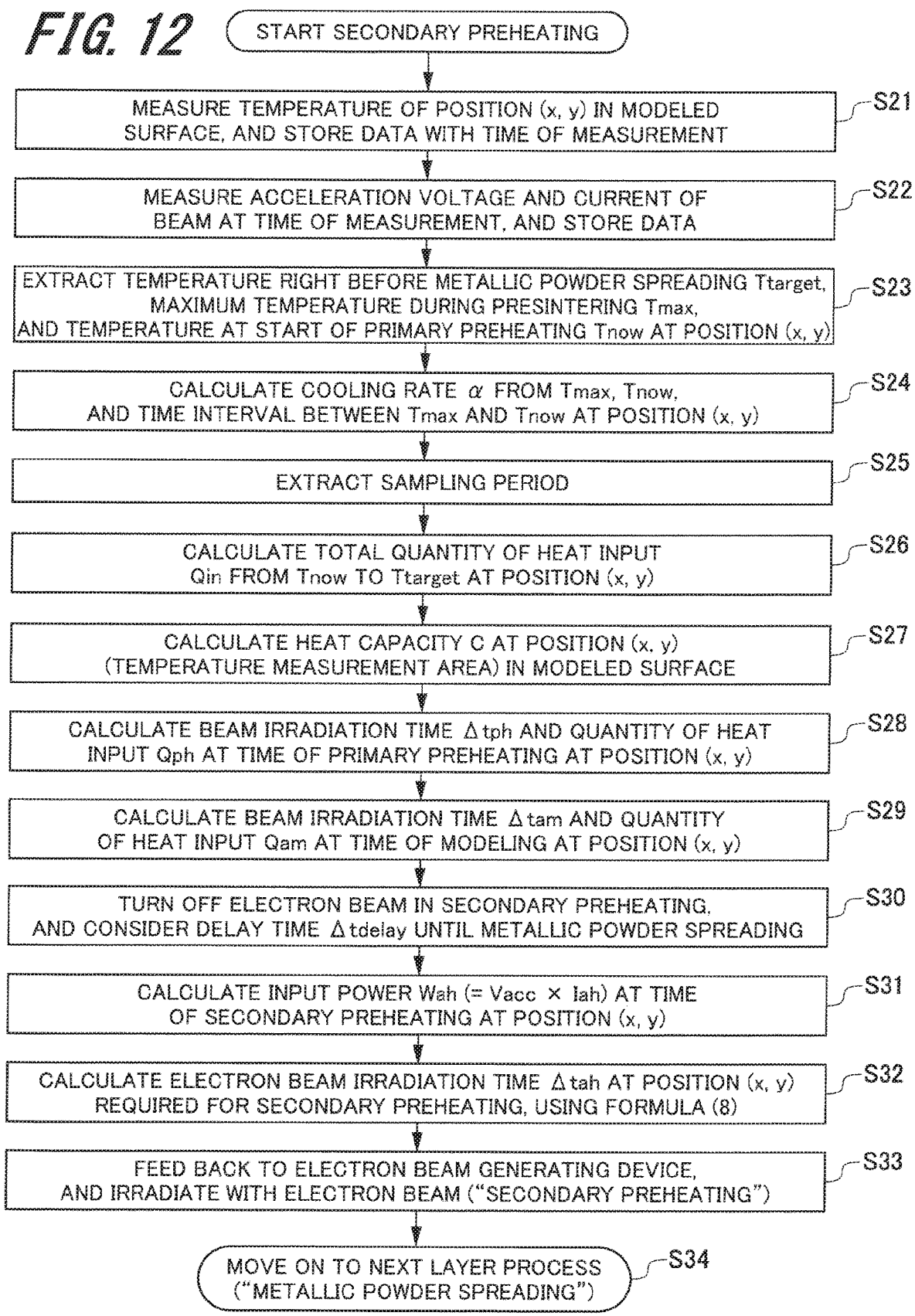
FIG. 12 is a flowchart showing exemplary steps of secondary preheating of the three-dimensional additive manufacturing device according to the second embodiment of the present invention.

FIG. 12 is a flowchart showing exemplary steps of secondary preheating of the three-dimensional additive manufacturing device 20A. The process in steps S21 to S35 shown in FIG. 12 corresponds to the process in steps S1 to S15 shown in FIG. 9. The basic operation at the time of the secondary preheating of the three-dimensional additive manufacturing device 20A is equivalent to the operation of the first embodiment (see FIG. 9). However, the second embodiment is different from the first embodiment in that the temperature of the modeled surface is measured two-dimensionally. A radiant temperature camera provided with an image capturing device such as a charge-coupled device (CCD) and a complementary metal-oxide semiconductor (CMOS) image sensor is the mainstream of current radiant temperature cameras, and such a radiant temperature camera is configured to acquire temperature information at constant time intervals per pixel of the image capturing device. In other words, a modeled surface is divided into small areas and two-dimensional temperature distribution of the modeled surface, which enables the temperature control described in the first embodiment for each area and improves the precision of temperature control with respect to the modeled surface.

The contents of the flowchart shown in FIG. 12 are similar to those in the first embodiment except that the measurement area (designated area) described in the first embodiment is changed to a measurement area in which each pixel captured by the wide-area thermometer 38A (radiant temperature camera) in the second embodiment or the number of pixel data to be subjected to binning is limited. In binning, several adjacent pixels (light receiving elements) on a chip of a CCD are combined, and a plurality of pixel values are averaged or added to another to obtain a single value.

In this embodiment, the wide-area thermometer 38A is provided so that the processes in steps S21, S23, S24, S26 to S29, S31, and S32 in FIG. 12 is slightly different from those in steps S1, S3, S4, S6 to S9, S11, and S12 (see FIG. 9) of the first embodiment. In the steps shown in FIG. 12, each unit in an electron beam drive control unit 37 calculates a temperature of a positional coordinate (x, y) in the manner as in the first embodiment, where (x, y) represents a pixel whose temperature is to be measured or a positional coordinate of a measurement area (for example, the center). An irradiation time calculating unit of the electron beam drive control unit 37 calculates an electron beam irradiation time $\Delta t_{ah}$ required for the secondary preheating for each positional coordinate (x, y) corresponding to the designated area (S32).

Next, the electron beam drive control unit 37 feeds back, to the electron beam generating device 2, a drive signal based on information of the electron beam irradiation time $\Delta t_{ah}$ required for the secondary preheating (S33). The electron beam generating device 2 scans each designated area in the modeled surface with the electron beam based on the drive signal supplied from the modeling control device 30 (electron beam drive control unit 37), and a required quantity of heat is input to each designated area ("secondary preheating").

When the calculation of the whole area of the modeled surface is completed, the irradiation time calculating unit 54 moves on to the subsequent layer process, that is, another step of metallic powder spreading (S34).

According to the second embodiment, the present applicants have proposed a method for setting a temperature of the whole area in a modeled surface constant, particularly, at the time of metallic powder spreading by introducing the wide-area thermometer 38A (two-dimensional thermometer) for measuring temperature distribution of the whole area in a modeled surface, which leads to an environment for three-dimensional additive manufacturing that prevents powder scattering.

Furthermore, according to the second embodiment, similarly to the first embodiment, a quantity of heat input to a designated area in a powder layer (modeled surface) is controlled with a heat source such as an electron beam so that a temperature of the designated area is set at a desired temperature at a future desired time.

In the first embodiment, the temperature of the predetermined temperature measurement area Am is measured, using a radiation thermometer as the thermometer 38. However, the three-dimensional additive manufacturing device may be provided with an unshown drive mechanism that allows the thermometer 38 to change a measurement area of interest in a modeled surface. With this driving mechanism, the thermometer 38 sequentially scans the whole area of the modeled surface, for example, within a predetermined time and measures a temperature of the whole area of the modeled surface. In this case, as in the second embodiment where the wide-area thermometer 38A is employed, the temperature of the whole area of the modeled surface is measured by driving the thermometer 38 according to the first embodiment. Therefore, it is possible to obtain effects substantially equal to those in the second embodiment.

The irradiation time $\Delta t_{ah}$ at each position (for example, pixel position) on the modeled surface calculated in step S32 is not uniform in the modeled surface, and the numerical value of the irradiation time may have distribution in the modeled surface. In such a case, using distribution of the irradiation time normalized with reference to an irradiation time at any designated position (reference position), the modeled surface is irradiated with the electron beam at the time of the secondary preheating so that distribution of the quantity of heat input on the modeled surface has a shape equivalent to the distribution of the irradiation time. In other words, the numerical value of the irradiation time may have distribution in the modeled surface, and the distribution of the irradiation time normalized for each position may be calculated with reference to an irradiation time at any position.

In regard to the electron beam irradiation at the time of the secondary preheating, the electron beam with a wide beam spot area scans the modeled surface at high speed to warm the modeled surface. The time for one-time scan of the whole modeled surface is extremely short, for example, in several hundred milliseconds. As a single irradiation pattern that ends in this short time, the quantity of heat to which the distribution of the irradiation time is reflected is given at each position. For example, when the irradiation time as the reference of each position (x, y) is set to 10 µs, the uniform irradiation time is changed to an irradiation time in which an imperceptible adjustment time corresponding to the distribution of the quantity of heat input is adjusted, and the modeled surface is irradiated with the electron beam within the changed irradiation time. When the one-time scan in several hundred milliseconds with the electron beam is repeated for several times, and when the total irradiation time calculated at the reference position reaches a specified irradiation time $\Delta t_{ah}$ (usually, in seconds), the electron beam irradiation for the secondary preheating is stopped. An example of the secondary preheating in which the distribution of the irradiation time is taken into account will be described later in a fifth embodiment and a sixth embodiment.

3. Third Embodiment

In place of the thermometer 38 of the first embodiment which employs a radiation thermometer, a third embodiment employs a thermometer 38B (see FIG. 13 described later) including thermocouples.

Figure 13:
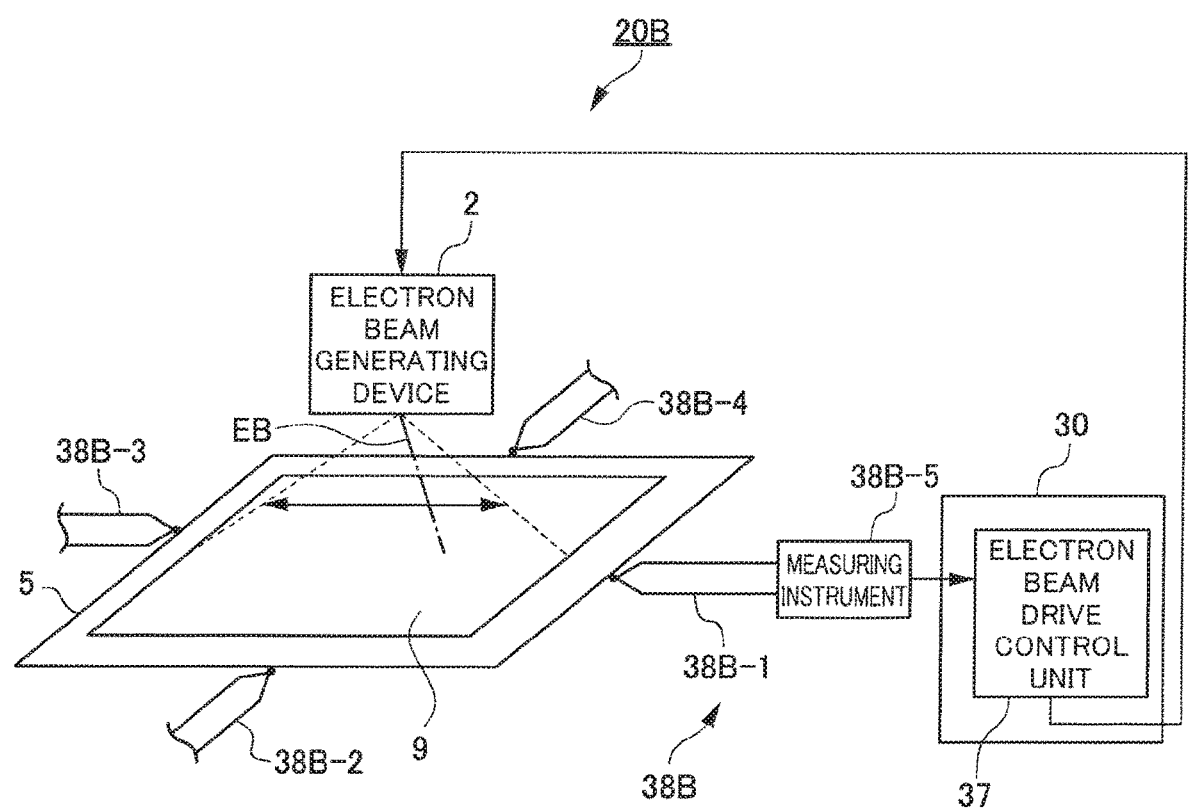
FIG. 13 is a schematic configuration diagram showing a system that controls a quantity of heat input by an electron beam of a three-dimensional additive manufacturing device according to a third embodiment of the present invention.

FIG. 13 is a schematic configuration diagram showing a system that controls a quantity of heat input by an electron beam of a three-dimensional additive manufacturing device according to the third embodiment. As shown in FIG. 13, a three-dimensional additive manufacturing device 20B includes the thermometer 38B that measures a temperature around an edge of a modeled surface. The thermometer 38B includes thermocouples 38B-1 to 38B-4 and a measuring instrument 38B-5. The thermocouples 38B-1 to 38B-4 are in contact with four sides of a quadrangular base plate 5.

Figure 14:
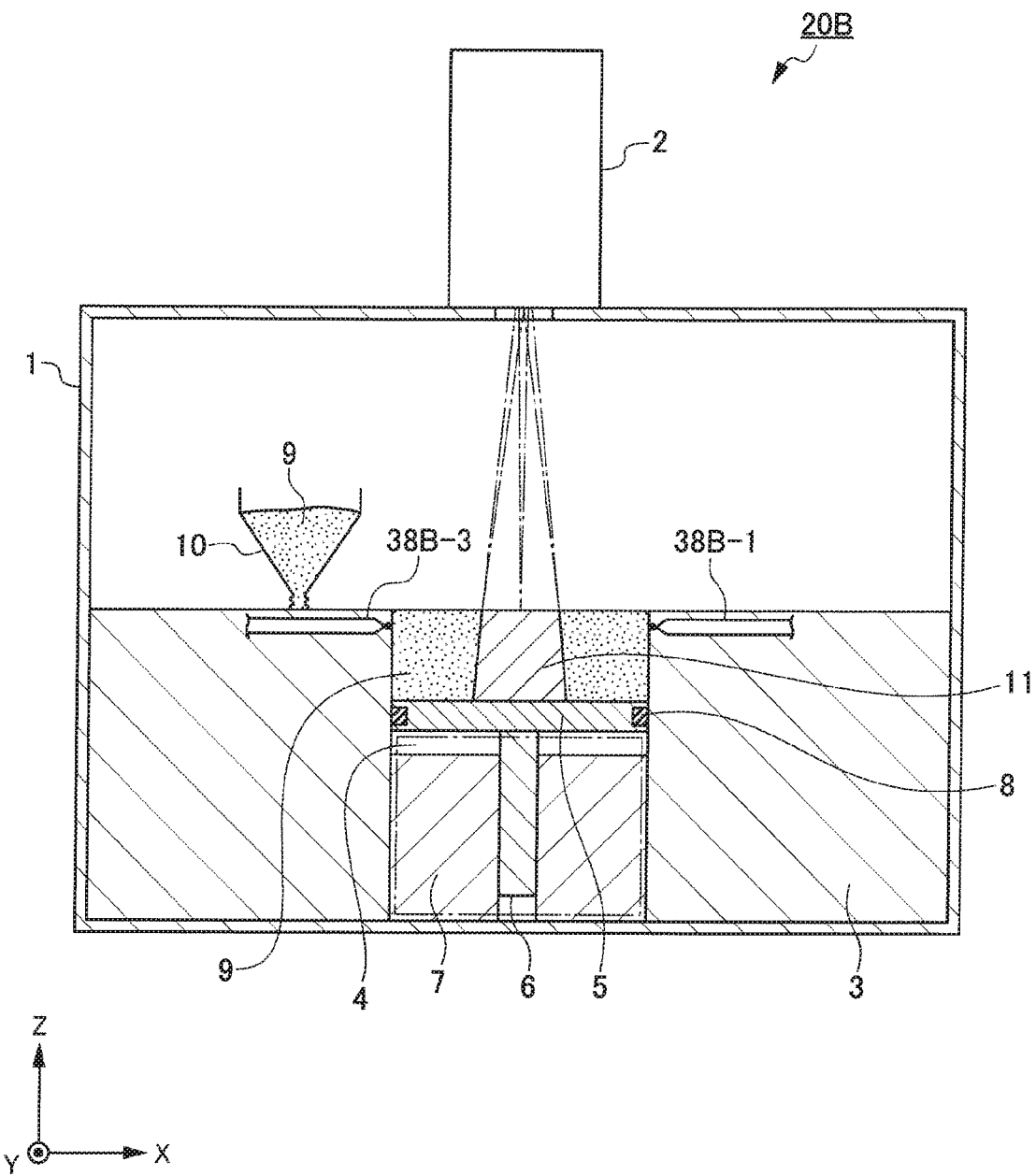
FIG. 14 is a schematic cross-sectional view showing an exemplary configuration of the three-dimensional additive manufacturing device according to the third embodiment of the present invention.

FIG. 14 is a schematic sectional view showing an exemplary configuration of the three-dimensional additive manufacturing device 20B. As shown in FIG. 14, the thermocouples 38B-1 to 38B-4 (the drawing shows the thermocouples 38B-1 and 38B-3) are buried inside a modeling underframe 3 so that junction points of metallic wires of the thermocouples 38B-1 to 38B-4 are placed on an end surface of the modeling underframe 3 in the side close to a pit 4. In this embodiment, the number of thermocouples is four, but at least one thermocouple may be provided. The larger the number of thermocouples, the more precisely a temperature of a modeled surface is calculated.

In the thermometer 38B, a signal corresponding to a potential difference between the two metallic wires included in each of the thermocouples 38B-1 to 38B-4 is supplied to the measuring instrument 38B-5. The measuring instrument 38B-5 uses information on the potential difference supplied from each of the thermocouples 38B-1 to 38B-4 at each sampling time and calculates the temperature (temperature distribution) of the modeled surface (designated area), for example, by the averaging method or the interpolation method. The thermometer 38B is a thermometer including thermocouples so that the precision of measured value is slightly inferior to the thermometer 38 of the first embodiment and the wide-area thermometer 38A of the second embodiment, but the thermometer 38B is cheaper.

According to the third embodiment, similarly to the first and second embodiments, a quantity of heat input to a designated area in a powder layer (modeled surface) is controlled with a heat source such as an electron beam so that a temperature of the designated area is set at a desired temperature at a future desired time.

4. Fourth Embodiment

In a fourth embodiment, a temperature of a modeled surface is not measured separately but is measured based on modeled surface temperature time-series data database 40 (see FIG. 15) in which preliminarily calculated temperature data is stored.

Figure 15:
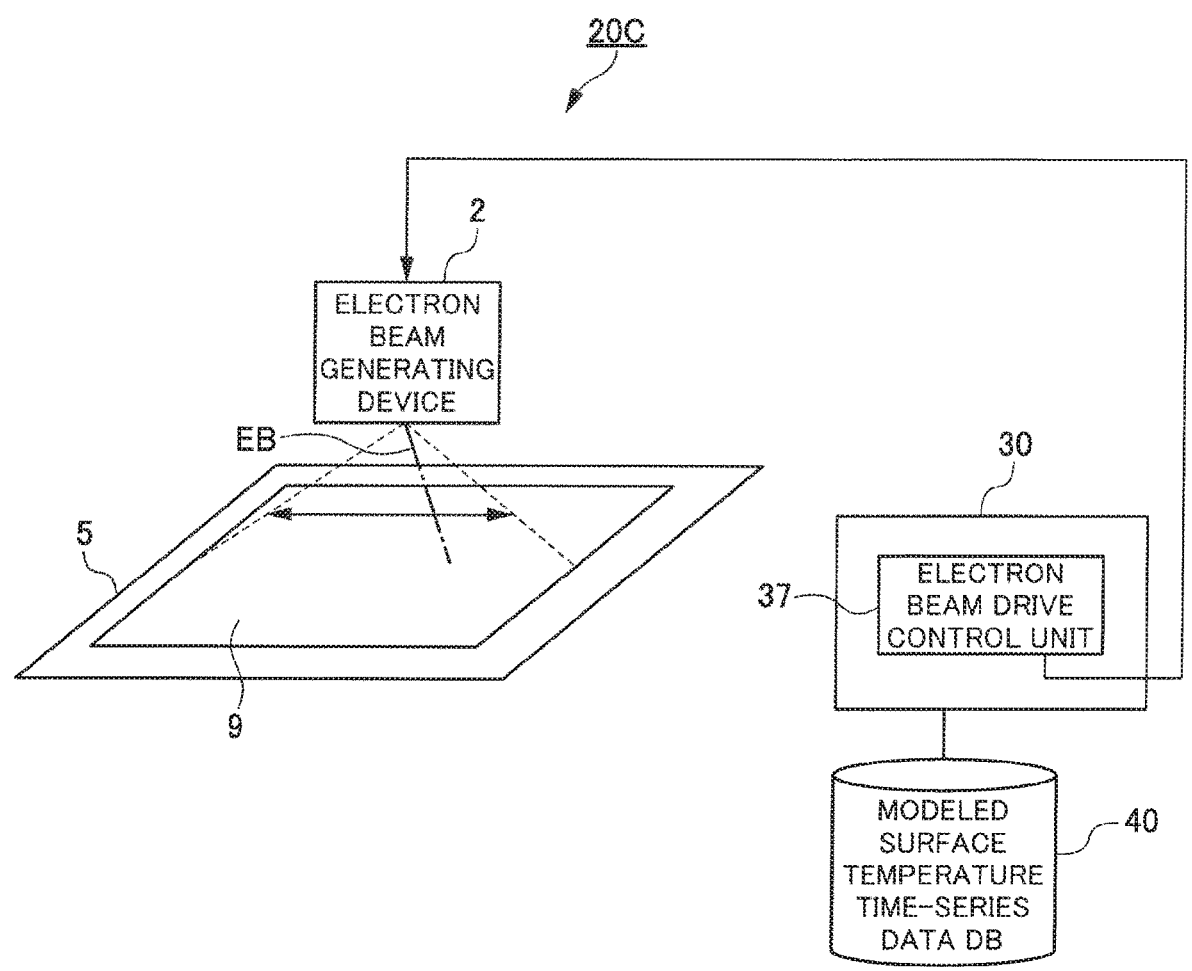
FIG. 15 is a schematic configuration diagram showing a system that controls a quantity of heat input by an electron beam of a three-dimensional additive manufacturing device according to a fourth embodiment of the present invention.

FIG. 15 is a schematic configuration diagram showing a system that controls a quantity of heat input by an electron beam of a three-dimensional additive manufacturing device according to the fourth embodiment. As shown in FIG. 15, in a three-dimensional additive manufacturing device 20C, the modeled surface temperature time-series data database (shown as "modeled surface temperature time-series data DB" in the drawing) 40 is connected to a modeling control device 30. In the modeled surface temperature time-series data DB 40, what is stored is time-series data of temperatures during the whole processes of a modeled surface in a model of interest. The time-series data is calculated in advance, for example, by the finite element method, and the modeled surface temperature time-series data DB 40 is included, for example, in an auxiliary storage unit 34. In synchronization with the number of laminated modeled layers (the order of powder layers), a heat capacity calculating unit 53 of an electron beam drive control unit 37 (see FIG. 8) reads time-series data of a temperature of a layer of interest (modeled surface) from the modeled surface temperature time-series data DB 40 and calculates heat capacity of the modeled surface (designated area).

Using the heat capacity and a heat loss rate obtained from the time-series data of the temperatures of the modeled surface accumulated in the modeled surface temperature time-series data DB 40, the modeling control device 30 calculates, in advance in real time, conditions for irradiation with an electron beam EB for setting the temperature of the modeled surface (designated area) at a desired temperature at a future desired time. The modeling control device 30 feeds back the conditions for irradiation with the electron beam EB to the electron beam generating device 2.

According to the fourth embodiment, the present applicants have proposed a method for setting a temperature of the whole area in a modeled surface constant, particularly, at the time of metallic powder spreading by performing simulation calculation in advance to simulate temperature distribution of the whole area and to prepare temperature time-series data, which leads to an environment for three-dimensional additive manufacturing that prevents powder scattering.

Furthermore, according to the fourth embodiment, similarly to the first embodiment, a quantity of heat input to a designated area in a powder layer (modeled surface) is controlled with a heat source such as an electron beam so that a temperature of the designated area is set at a desired temperature at a future desired time.

5. Fifth Embodiment

Figure 16:
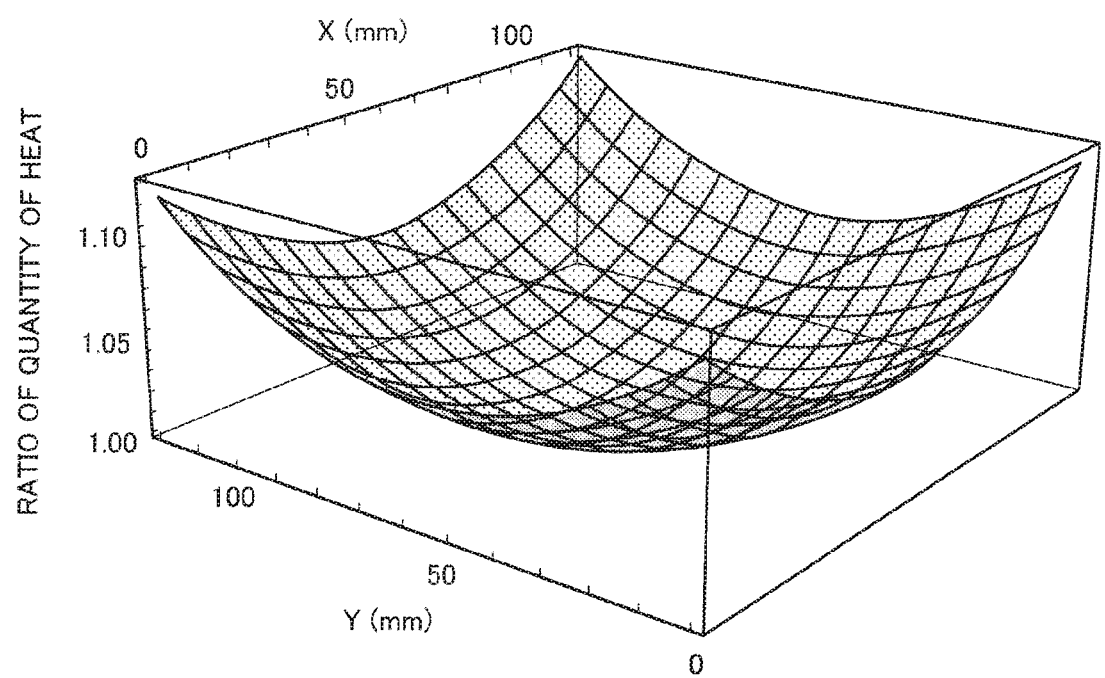
FIG. 16 is a graph showing distribution intensity of a quantity of heat input (electron beam irradiation time) for setting a temperature of the whole area in a modeled surface at a desired temperature at the time of metallic powder spreading.

Referring to FIG. 16, hereinafter described is a quantity of heat input for setting a temperature of the whole area in a modeled surface at a desired temperature at the time of spreading metallic powder. FIG. 16 is a graph showing distribution intensity of a quantity of heat input (electron beam irradiation time) for setting a temperature of the whole area in a modeled surface at a desired temperature at the time of metallic powder spreading. In the drawing, positions on the modeled surface are taken along the X axis (a first horizontal axis) and the Y axis (a second horizontal axis), and a ratio of the quantity of heat input is taken along the Z axis (the vertical axis).

In typical preheating, an area from a part slightly inside the edges of a base plate 5 to a central part of the base plate 5 is irradiated with an electron beam so that the temperature of the modeled surface rises. However, an end portion of the base plate 5 in contact with the periphery (for example the modeling underframe 3 in FIG. 5) has high heat loss so that a temperature of the end portion is low. In order to set the temperature of the end portion of the base plate 5 at a desired temperature when spreading the metallic powder 9, it is desirable to prolong an electron beam irradiation time with respect to the periphery of the base plate 5 at the time of secondary preheating. An irradiation time $\Delta t_{ah}$ required at this time is calculated, for example, by analyzing time-series data of a temperature at each positional coordinate measured by the wide-area thermometer 38A, according to the three-dimensional additive manufacturing of the first embodiment. In other words, heat capacity, a rate of temperature decrease, a quantity of heat input, and the like are calculated by a conventionally well-known method, and then, a beam irradiation time of an area of interest is obtained from Formula (8) prepared by the present applicants.

FIG. 16 shows an example of the distribution intensity of the electron beam irradiation time (ratio of the quantity of heat) when the base plate 5 of 12 centimeters square is heated in such a manner that a temperature right before the metallic powder spreading becomes constant over the whole area of a powder layer. In regard to conditions for irradiation with the electron beam, a delay time $\Delta t_{delay}$ is set to 4 seconds, and in regard to conditions for irradiation with the electron beam at the time of the secondary preheating, an acceleration voltage is set to 60 kV, an emission current value is set to 30 mA, and an irradiation time at a central position of the modeled surface is set to 27 seconds. At this time, when the quantity of heat input to the central position is normalized to "1", it is necessary to increase the quantity of heat input toward the periphery of the base plate 5 (particularly the four corners), and the quantity of heat toward the periphery of the base plate 5 is estimated to increase by about 11% of the quantity of heat at the central position. The increasing function of the quantity of heat input has a shape approximated by a quadratic parabola.

According to the fifth embodiment, a quantity of heat to be input to a modeled surface is determined in consideration of temperature distribution of the whole area (central position and end portion) of the modeled surface. Accordingly, in the fifth embodiment, in addition to the effect of the second embodiment, a temperature of a designated area in a powder layer (modeled surface) is controlled more precisely to be set at a desired temperature at a future desired time.

6. Sixth Embodiment

Figure 17:
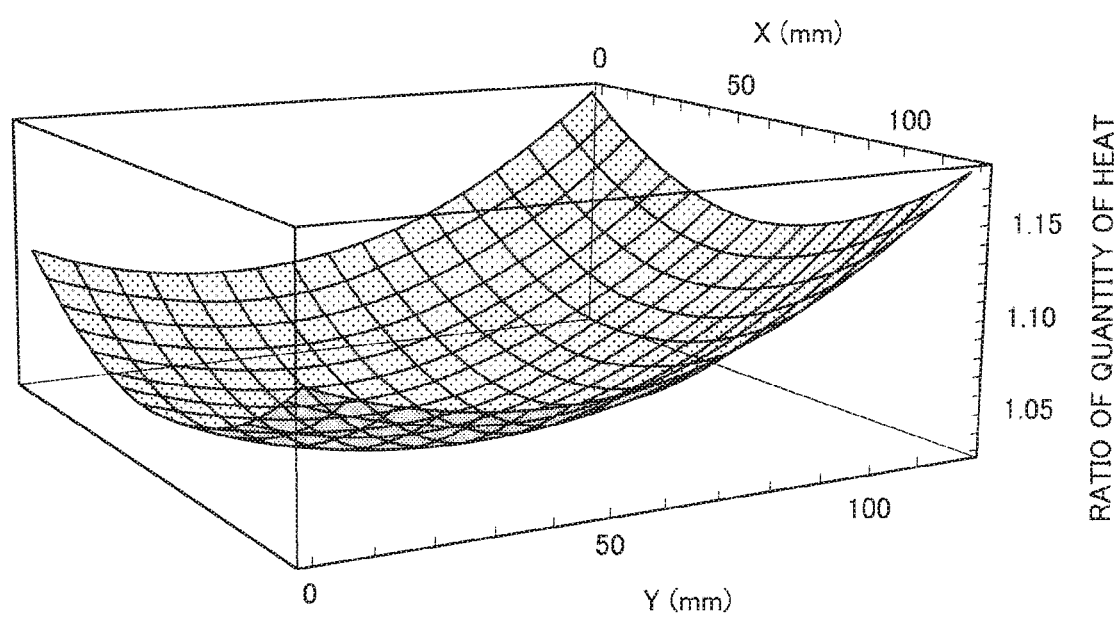
FIG. 17 is a graph showing distribution intensity of a quantity of heat input (electron beam irradiation time) for setting a temperature of the whole area in a modeled surface at a desired temperature at the time of metallic powder spreading when a delay time dependent on the metallic powder spreading is taken into account.

Referring to FIG. 17, hereinafter described is a quantity of heat input for setting a temperature of the whole area in a modeled surface at a desired temperature at the time of metallic powder spreading when a delay time dependent on the metallic powder spreading is taken into account.

FIG. 17 is a graph showing distribution intensity (ratio of quantity of heat) of a quantity of heat input (electron beam irradiation time) for setting a temperature of the whole area in a modeled surface at a desired temperature at the time of metallic powder spreading when a delay time dependent on the metallic powder spreading is taken into account. Similarly to the example shown in FIG. 16, in regard to conditions for irradiation with the electron beam, a delay time $\Delta t_{delay}$ is set to 4 seconds, and in regard to conditions for irradiation with the electron beam at the time of secondary preheating, an acceleration voltage is set to 60 kV, an emission current value is set to 30 mA, and an irradiation time without considering a delay time at a central position of the modeled surface is set to 27 seconds.

When spreading the metallic powder on the heated modeled surface, it is not always possible to spread the metallic powder over the whole area of the modeled surface at once. A linearly-supply funnel 10 (arm) moves from left to right or from right to left so that a delay is caused in the time of spreading the metallic powder. With a low moving speed of the arm or with a wide area in an upper surface of a base plate 5, this delay should not be ignored. When the delay time due to the movement of the arm (movement of the powder feeding unit) is added to the delay time $\Delta t_{delay}$ in Formula (7) or (8), even though the time of the metallic powder spreading is different, the beam irradiation time at the time of the secondary preheating is adjusted so that the temperature of the modeled surface at the time of metallic powder spreading is always at a designated value.

FIG. 17 shows the distribution of the irradiation time (ratio of quantity of heat) in which a time to cross the base plate 5 of 12 centimeters square is taken into account, where a speed of the arm moving from left to right (along the Y axis direction from the position of 0 mm in the Y coordinate) is set to 50 mm/s. FIG. 17 clearly shows a rate at which the beam irradiation time increases along with the movement of the linearly-supply funnel 10 to the right. In the graph of FIG. 17, comparing the left side (around 0 mm in the Y coordinate) and the right side (around 120 mm in the Y coordinate), the ratio of the quantity of heat on the right side is higher. In other words, the beam irradiation time is longer on the right side. This is because the linearly-supply funnel 10 (arm) arrives late (the delay time $\Delta t_{delay}$ is large) on the right side, which increases heat loss on the right side and increases, by the amount of the increased heat loss, the quantity of heat required to keep the temperature of the modeled surface constant.

According to the sixth embodiment, a quantity of heat to be input to a modeled surface is determined in consideration of a delay time dependent on the metallic powder spreading. Accordingly, in the sixth embodiment, in addition to the effect of the second embodiment, a temperature of a designated area in a powder layer (modeled surface) is controlled more precisely to be set at a desired temperature at a future desired time.

7. Seventh Embodiment

In the seventh embodiment, to calculate heat capacity of a temperature measurement area (designated area), what is used is average heat capacity calculated based on several pieces of modeling data in the past (of a lower layer) (including temperature time-series data of the temperature measurement area, and an emission current value of an electron beam). Accordingly, an electron beam irradiation time $\Delta t_{ah}$ which is not affected by noise and is required for secondary preheating is calculated.

Furthermore, using several average values of the slope a in the past which are a rate of temperature decrease calculated with a maximum temperature during presintering $T_{max}$ and a measured value of a temperature right before primary preheating $T_{now}$, it is possible to calculate the rate of temperature decrease not affected by noise, which improves the precision of the temperature decrease.

In regard to the several pieces of modeling data in the past (of the lower layer), simulation data may be used instead of actual measured values or setting values at the time of modeling.

In the first to sixth embodiments, when the current value $I_{ah}$ of the secondary preheating is changed, using Formula (8) enables calculation of the electron beam irradiation time $\Delta t_{ah}$ required for the secondary preheating in which the change of the current value $I_{ah}$ is reflected. In the irradiation time $\Delta t_{ah}$, an amount of heat loss dependent on changes in irradiation time is taken into consideration, and effects of decreasing (increasing) the amount of heat loss due to shortening (prolonging) the irradiation time $\Delta t_{ah}$ is also reflected.

Experimental Result

Hereinafter described is an example in which the three-dimensional additive manufacturing device 20A according to the second embodiment is used to control the beam irradiation time when there is a plurality of models.

Figure 18:
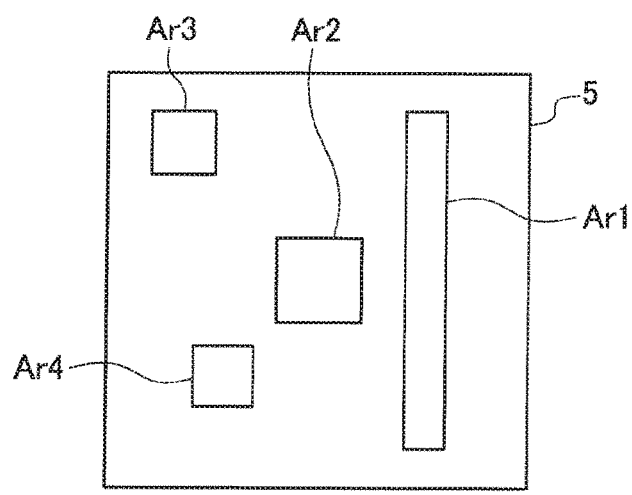
FIG. 18 is a plan view showing an exemplary arrangement of a plurality of models.

FIG. 18 is a plan view showing an exemplary arrangement of a plurality of models. The example in FIG. 18 shows the base plate 5 viewed from above, and on the base plate 5, areas Ar1, Ar2, Ar3, and Ar4 where four models are arranged are set.

Figure 19:
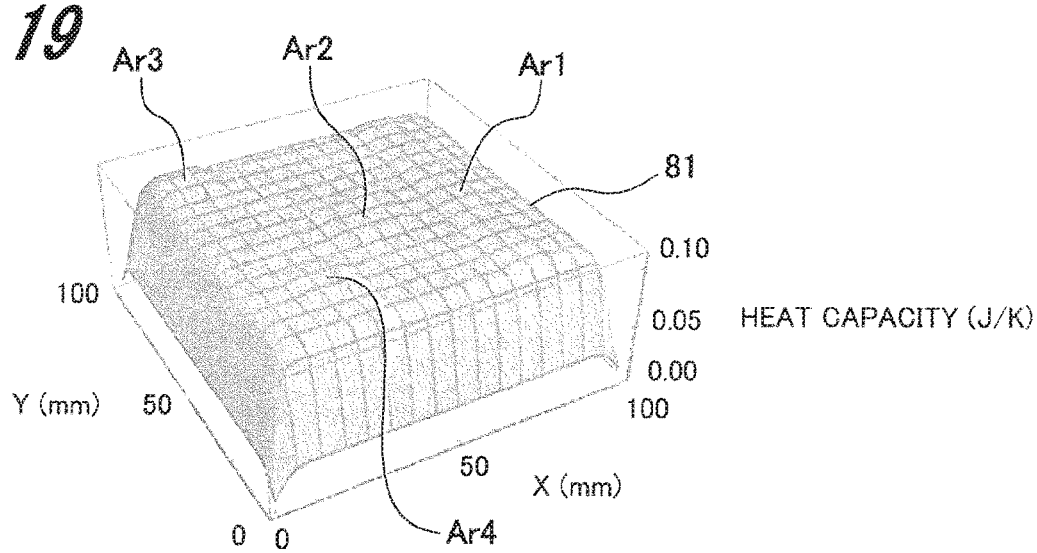
FIG. 19 is a graph showing an example of heat capacity of an additively manufactured three-dimensional model when the model is manufactured with a certain number of layers.

FIG. 19 is a graph showing an example of heat capacity of an additively manufactured three-dimensional model shown in FIG. 13 when the model is manufactured with a certain number of layers. When a specific number of layer (50th layer) is modeled, heat capacity of four layers, that is, the layer of the specific number (50th layer) and the past three layers (47th layer, 48th layer, and 49th layer), is averaged to obtain average heat capacity [J/K] of a modeled surface. The average heat capacity is represented by a curve 81.

The curve 81 has a planar feature as a whole, but in the areas Ar1, Ar2, Ar3, and Ar4 where the four models are arranged, the heat capacity seems to be slightly large. This indicates that a temperature at each position including a model is "difficult to heat and difficult to cool". On the other hand, heat capacity at the periphery of a powder layer is small, indicating that a temperature at the periphery is "easy to heat and easy to cool".

Figure 20:
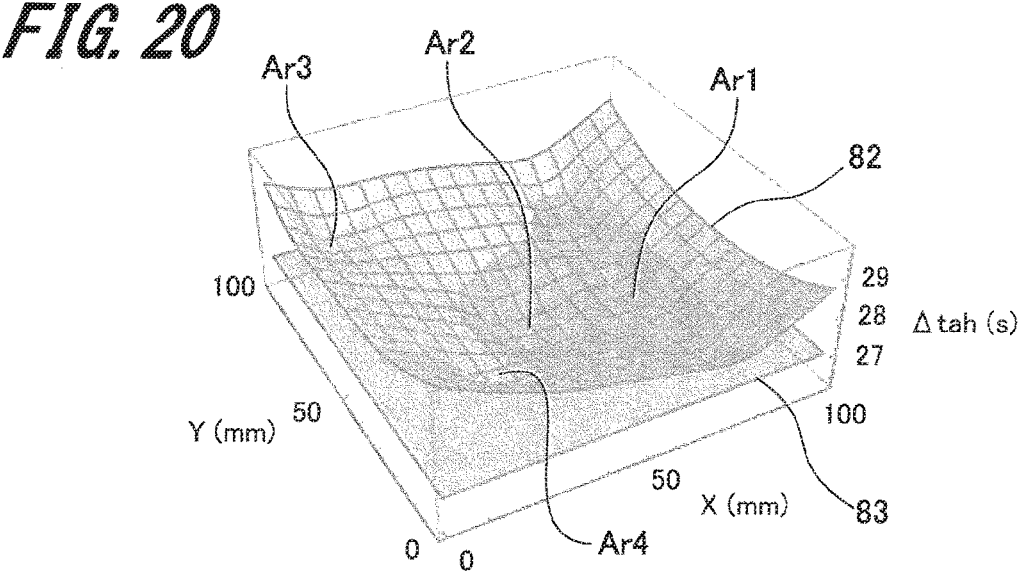
FIG. 20 is an explanatory view showing calculation results of a required irradiation time at the time of the secondary preheating after manufacturing a model with a certain number of layers.

FIG. 20 is an explanatory view showing calculation results of irradiation time required at the time of the secondary preheating after manufacturing a model with a certain number of layers. Using the heat capacity shown in FIG. 19 calculated at each mesh position, a beam irradiation time $\Delta t_{ah}$ [s] required for the secondary preheating (after-heating) is calculated so that, after modeling the 50th layer, the temperature right before the metallic powder spreading $T_{target}$ of the whole area in a modeled surface of the 51st layer is set to, for example, 715° C., and the calculated result is represented by a curve 82.

A plane 83 under the curve 82 represents an electron beam irradiation time with respect to the 50th layer at 27th second in the secondary preheating, indicating that the whole area of an irradiation surface is irradiated at a constant period of time. Looking close at the irradiation time modulated by the modeled surface, it is understood that the areas including the four models require the beam irradiation time shorter than that in the periphery of the modeled surface. It is found that that the beam irradiation time is modulated by about 10% according to the heat capacity of each location in the modeled surface. At the periphery of the modeled surface, the surface is warmed with a long beam irradiation time as expected, otherwise, the temperature right before the metallic powder spreading $T_{target}$ is not at a desired temperature, 715° C.

In each of the embodiments, the electron beam (charged particle beam) is illustrated as a heat source, but the present invention may employ a three-dimensional additive manufacturing device using a laser beam.

Furthermore, the present invention is not limited to each of the embodiments and may employ various other applications and modifications within the gist of the present invention disclosed in the claims.

In the embodiments, the configuration of each device and system is described in detail and in the concrete to make the present invention easily understood. It should be noted that the present invention is not limited to the apparatus provided with the whole configurations described in the embodiments. In addition, the configuration of an embodiment may be partially replaced by the configuration of another embodiment. Furthermore, the configuration of an embodiment may be added to the configuration of another embodiment. Still further, the configuration of each embodiment may be added, deleted, or replaced by the configuration of another embodiment.

Each of the configurations, functions, units, methods, and the like may be achieved by hardware, for example, by designing part or all of them with an integrated circuit or the like.

What is claimed is:

1. A three-dimensional additive manufacturing device, comprising:
   a base plate configured to move along a vertical direction;
   a powder feeding unit configured to laminate a powder layer including a powder sample on an upper surface of the base plate;
   a beam generating unit configured to generate a beam in a designated quantity of heat; and
   a control unit configured to control modeling by causing the beam generating unit to irradiate a designated position of the powder layer prepared on the base plate with the beam in a scan order programed based on three-dimensional model data,
   wherein the control unit controls modeling by repeating steps including:
      spreading the powder sample thinly on a top surface of the base plate and laminating the powder layer;
      presintering to mildly sinter the powder sample of the powder layer after the spreading;
      primarily preheating the powder layer to return the temperature of the designated position at a desired temperature by scanning through the powder layer with the beam after the presintering;
      modeling by irradiating the designated position of the powder layer with the beam in the scan order programed based on the three-dimensional model data; and
      secondarily preheating the powder layer to set the temperature of the designated position at a target temperature by irradiating the powder layer with the beam after the modeling and before moving on to the spreading,
   wherein the control unit calculates heat capacity of the designated position of the powder layer by following formula (4):

$$C = V_{acc} \times \Sigma_j(I_j \times \tau_j)/T_{target} - T_{now} + \alpha \cdot \Delta t \qquad (4)$$

where
      C represents heat capacity of the designated position of the powder layer;
      $T_{target}$ represents temperature right before the spreading;
      $T_{now}$ represents temperature right before the primary preheating;
      $V_{acc}$ represents acceleration voltage of the beam generating unit;
      $I_j$ represents an emission current of electron beam;
      $\tau_j$ represents irradiation time of the emission current;
      $\Delta t$ represents time difference between the temperature right before the primary preheating and the temperature right before the powder spreading; and
      $\alpha$ represents cooling rate calculated using the maximum temperature during the presintering, the temperature right before the primary preheating, and the time interval between those two temperatures,
   wherein the control unit determines a required quantity of heat to be input to the designated position, based on the calculated heat capacity, to set a temperature of the designated position at a desired temperature at a future designated time, and the control unit controls the beam generated by the beam generating unit to enable input of the required quantity of heat to the designated position.

2. The three-dimensional additive manufacturing device according to claim 1,
   wherein the required quantity of heat is to be input to the designated position in the secondary preheating, and is determined based on following formula (8):

$$\Delta t_{ah} = C(T_{target} - T_{now} + u \cdot (\Delta t_{ph} + \Delta t_{am} + \Delta t_{delay})) - (Q_{ph} + Q_{am})/V_{acc} \times I_{ah} \alpha \times C \qquad (8)$$

where
      $\Delta t_{ah}$ represents electron beam irradiation time required for the secondary preheating;
      $T_{target}$ represents temperature right before the spreading;
      $T_{now}$ represents temperature right before primary preheating;
      $\alpha$ represents cooling rate calculated using the maximum temperature during the presintering, the temperature right before the primary preheating, and the time interval between those two temperatures,
      C represents heat capacity of the designated position of the powder layer;
      $\Delta t_{ph}$ represents beam irradiation time during the primary preheating;
      $\Delta t_{am}$ represents beam irradiation time during the modeling;
      $\Delta t_{delay}$ represents delay time, which is a time from when the electron beam is turned off in the secondary preheating to the time of the spreading;

$Q_{ph}$ represents quantity of heat input during the primary preheating;

$Q_{am}$ represents quantity of heat input during the modeling;

$I_{ah}$ represents emission current value within the beam irradiation time during the secondary preheating; and $V_{acc}$ represents acceleration voltage of the beam generating unit.

3. The three-dimensional additive manufacturing device according to claim 1,
wherein the control unit calculates the heat capacity of the designated position of the powder layer based on a quantity of heat input by the beam emitted to the designated position and based on a temperature of the designated position after irradiation with the beam.

4. The three-dimensional additive manufacturing device according to claim 1,
wherein the control unit adjusts the quantity of heat input to the designated position according to an irradiation time of the beam.

* * * * *